(12) United States Patent
Lopez et al.

(10) Patent No.: US 9,780,980 B2
(45) Date of Patent: Oct. 3, 2017

(54) TRANSMITTER, A RECEIVER, AND METHODS THEREIN

(71) Applicant: TELEFONAKTIEBOLAGET LM ERICSSON (PUBL), Stockholm (SE)

(72) Inventors: Miguel Lopez, Solna (SE); Dennis Hui, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/311,240

(22) PCT Filed: May 20, 2014

(86) PCT No.: PCT/SE2014/050613
§ 371 (c)(1),
(2) Date: Nov. 15, 2016

(87) PCT Pub. No.: WO2015/178808
PCT Pub. Date: Nov. 26, 2015

(65) Prior Publication Data
US 2017/0078124 A1    Mar. 16, 2017

(51) Int. Cl.
*H04B 7/08* (2006.01)
*H04L 27/20* (2006.01)
(Continued)

(52) U.S. Cl.
CPC ....... *H04L 27/2003* (2013.01); *H04B 7/0413* (2013.01); *H04B 7/06* (2013.01);
(Continued)

(58) Field of Classification Search
CPC .......................... H04L 27/2003; H04L 1/0631; H04L 1/0625; H04L 1/0668; H04B 7/0806; H04B 7/0413
(Continued)

(56) References Cited

U.S. PATENT DOCUMENTS

| 2013/0039398 | A1* | 2/2013 | Ko ............................. H04L 1/08 375/219 |
| 2013/0272273 | A1* | 10/2013 | Lopez ............... H04W 72/0446 370/336 |
| 2017/0099170 | A1* | 4/2017 | Lopez ..................... H04B 7/06 |

OTHER PUBLICATIONS

Al-Dhahir, N., Single-Carrier Frequency-Domain Equalization for Space-Time Block-Coded Transmissions Over Frequency-Selective Fading Channels, IEEE Communications Letters, vol. 5, No. 7, pp. 304-306, Jul. 2001.
(Continued)

*Primary Examiner* — Siu Lee

(57) ABSTRACT

A method in a transmitter for transmitting CPM signals to a receiver. The transmitter divides bits into first and second sequences; duplicates the sequences into third and fourth sequences. The first and second sequences are mapped into a first layer, and the third fourth sequences are mapped into a second layer. The transmitter time reverses one of the first and second sequences, and one of the third and fourth sequences; and maps 1 to 0 and 0 to 1 in one of the time reversed sequence in each layer. The transmitter formats the first and second sequences into a first burst, and the third and fourth sequences into a second burst; and applies differential encoding to the bursts when a modulation index value is a non-integer. The first and second bursts are continuous phase modulated and transmitted as first and second CPM signals through a respective antenna.

19 Claims, 10 Drawing Sheets

Method in a transmitter 110

(51) Int. Cl.
*H04L 1/06* (2006.01)
*H04B 7/0413* (2017.01)
*H04B 7/06* (2006.01)

(52) U.S. Cl.
CPC ............. *H04B 7/08* (2013.01); *H04L 1/0625* (2013.01); *H04L 1/0631* (2013.01); *H04L 1/0668* (2013.01)

(58) Field of Classification Search
USPC ....... 375/295, 316, 259, 260, 299, 346, 347, 375/348, 349
See application file for complete search history.

(56) References Cited

OTHER PUBLICATIONS

Li, et al., A Space-Time Coding Design for Continuous Phase Modulation Over the Frequency Selective Fading Channel., 2012 IEEE Wireless Communications and Networking Conference: PHY and Fundamentals, pp. 241-245, Apr. 2012.
Mengali, et al., Decomposition of M-ary CPM Signals into PAM Waveforms, IEEE Transactions on Information Theory, vol. 41, No. 5, pp. 1265-1275, Sep. 1995.
Lindskog, et al., A Transmit Diversity Scheme for Channels with Intersymbol Interference, IEEE International Conference on Communications, pp. 307-311, Jun. 18-21, 2000.
Zangi, et al., Physical-Layer Issues for Deploying Transmit Diversity in GPRS/EGPRS Networks, IEEE Proceedings on 54th Vehicular Technology Conference, pp. 538-542, Oct. 7-11, 2001.

\* cited by examiner

Figure 1 Lindskog-Paulraj transmit diversity (prior art)

Fig. 3 Method in a transmitter 110

Fig. 5 Method in a receiver 120

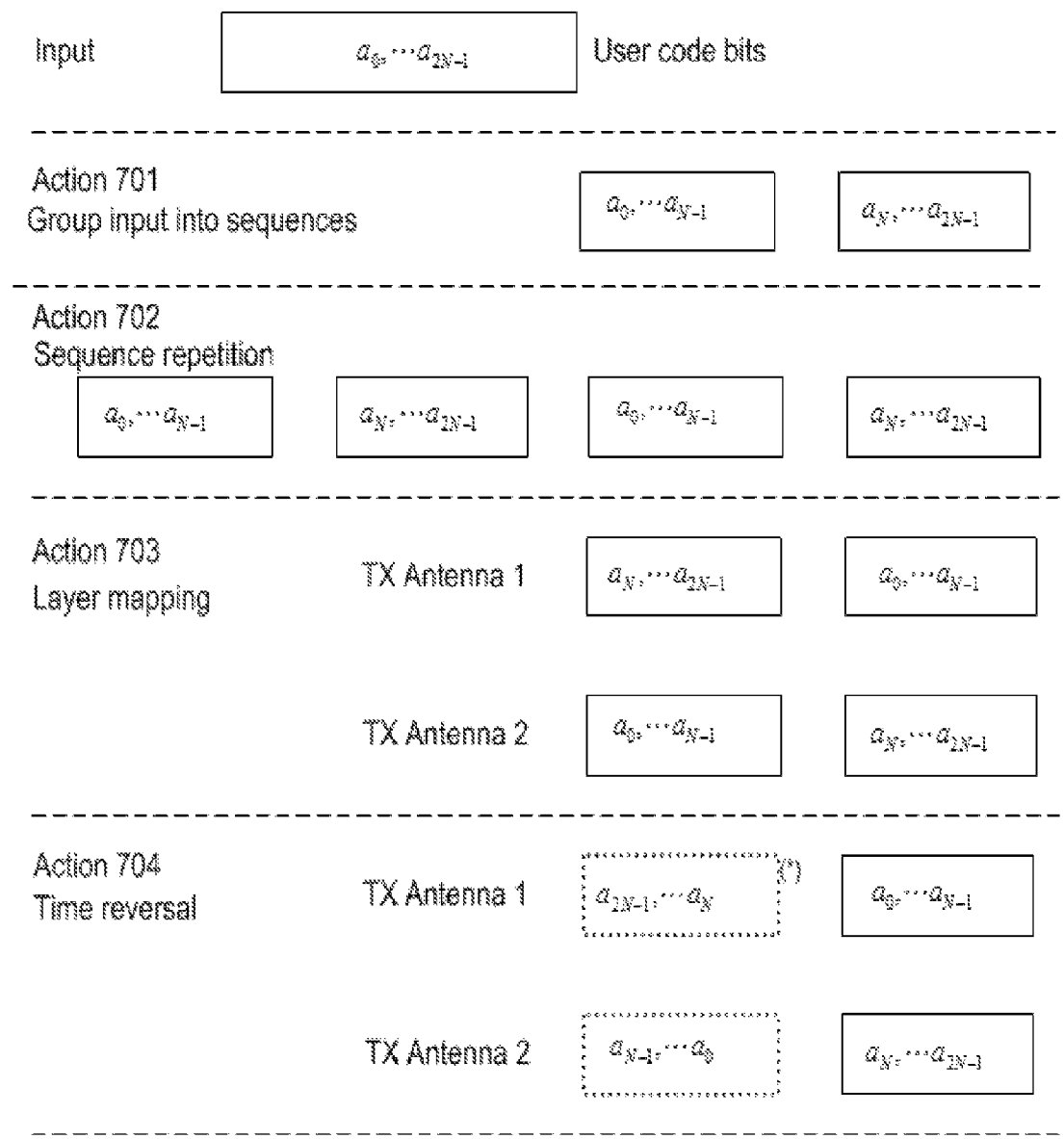
Fig. 7 Transmitter processing, first part, continues on next page

Action 705
Bit flipping
TX Antenna 1    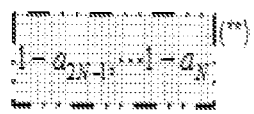  $a_0, \cdots a_{N-1}$
TX Antenna 2    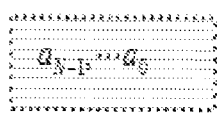  $a_N, \cdots a_{2N-1}$
Action 706
Burst formatting
TX Antenna 1    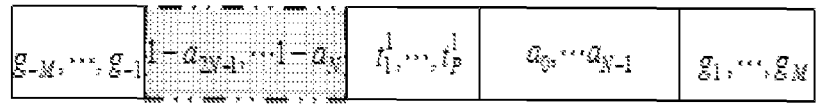
TX Antenna 2    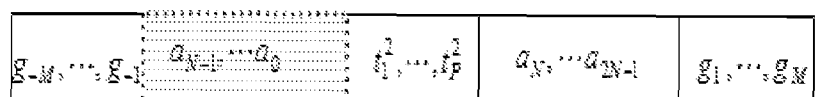
Notes:  (*) ≡ Time reversal
       (**) ≡ Time reversal and bit flip
Fig. 7, continued

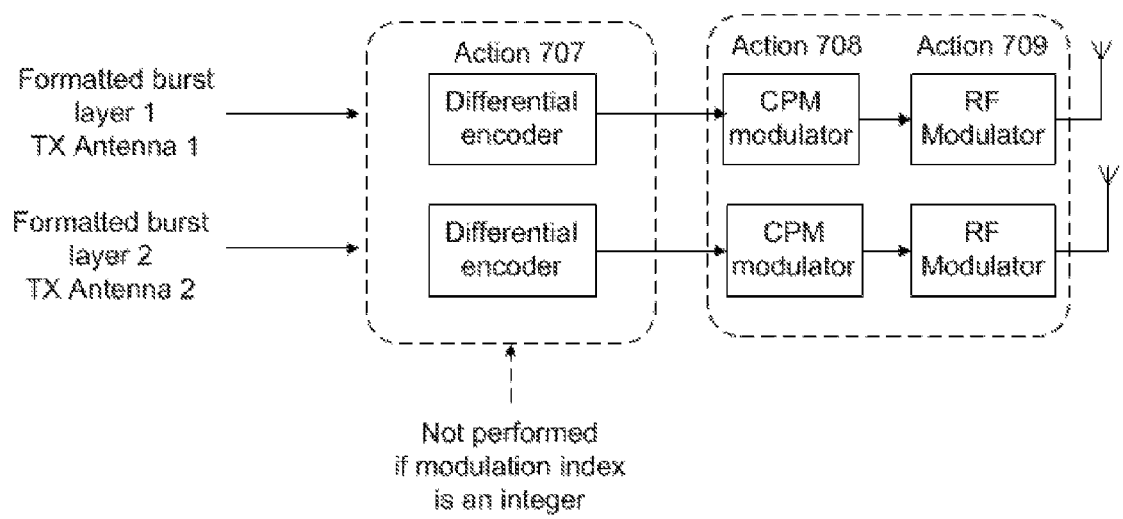
Figure 8 Transmitter processing, second part

Receiver processing

TRANSMITTER, A RECEIVER, AND METHODS THEREIN

This application is a 371 of International Application No. PCT/SE2014/050613, filed May 20, 2014, the disclosure of which is fully incorporated herein by reference.

TECHNICAL FIELD

Embodiments herein relate generally to a transmitter, a receiver and to methods therein. In particular they relate to the transmission and reception of one or more Continuous Phase Modulated (CPM) signal.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Continuous Phase Modulation (CPM) is a method for modulation of data commonly used in wireless communications systems. For example, CPM is used in wireless modems of wireless communications systems. In contrast to other coherent digital phase modulation techniques wherein the carrier phase abruptly resets to zero at the start of every symbol, with CPM the carrier phase is modulated in a continuous manner. For instance, with a coherent digital phase modulation technique, such as Quadrature Phase-Shift Keying (QPSK), the carrier instantaneously jumps from a sine to a cosine, i.e. a 90 degree phase shift, whenever one of the two message bits of the current symbol differs from the two message bits of the previous symbol. This discontinuity requires a relatively large percentage of the power to occur outside of the intended band, e.g., high fractional out-of-band power, leading to poor spectral efficiency. Furthermore, CPM is typically implemented as a constant-envelope waveform, i.e. the transmitted carrier power is constant. CPM is advantageous because the phase continuity yields high spectral efficiency, and the constant envelope yields excellent power efficiency. However, a drawback is the high implementation complexity required for an optimal receiver.

CPM is a non-linear digital modulation method in which the phase of the signal is continuous. As mentioned above, it has excellent spectral characteristics. One of the most notable advantages of CPM is that it has constant envelope waveform, and therefore it is appropriate for use in transmitters using non-linear power amplifiers. For these reasons CPM is widely used in cellular communication systems and in satellite communication systems.

Transmit diversity is radio communication using signals that originate from two or more independent transmitters that have been modulated with identical information-bearing signals. Further, the signals may vary in their transmission characteristics at any given instant.

Transmit diversity may overcome the effects of fading, outages, and circuit failures. When using diversity transmission and reception, the amount of received signal improvement depends on the independence of the fading characteristics of the signal as well as circuit outages and failures.

In many communications systems, adding antennas to a receiver or a transmitter may be expensive or impractical. In such cases, transmit diversity using multiple transmit antennas may be used to provide diversity benefits at the receiver.

Since transmit diversity with N transmit antennas results in N sources of interference to other users, the interference environment will be different from conventional communication systems comprising one transmit antenna. Thus, even if transmit diversity has almost the same performance as receive diversity in noise-limited environments, the performance in interference-limited environments will differ.

Thus, transmit diversity techniques improve link performance without the need to add extra Radio Frequency (RF) equipment at the receiver, e.g. a mobile unit. A transmit diversity scheme specifically designed for channels with time dispersion was introduced in Lindskog and Paulraj, "A Transmit Diversity Scheme for delay Spread Channels", in Pro. IEEE Int. Conf. Commun. (ICC 2000), June 2000.

Below some properties of CPM and prior art on transmit diversity techniques will be described.

Decomposition of CPM Signals into Pulse Amplitude Modulation (PAM) Waveform

This section relates to a brief review of some background material that is needed in order to understand some embodiments which will be described herein. A detailed exposition of the material in this section is found in "Decomposition of M-ary CPM Signals into PAM Waveforms" (Mengali U., and Morelli, M., IEEE Transactions on Information Theory, vol. 41, no. 5, 1995).

Given a bit sequence $\vec{a}=\{a_k\}_{k=0}^{N}$, $a_k \in \{0,1\}$, a complex baseband CPM signal has the form $S(t)=\exp(j\psi(t, \vec{a}))$ with $$\psi(t, \vec{a}) = 2h\pi \sum_{n=0}^{N} \alpha_n q(t-nT),$$

where h is the modulation index, T is the signaling interval, $\alpha_k=1-2a_k \in \{-1,1\}$ are the information symbols and q(t) is the phase pulse. The phase pulse is related to the frequency pulse f(t) by the relation $$q(t) = \int_{-\infty}^{t} f(s)ds.$$

The frequency pulse f(t) is time limited to the interval (0,LT), where L is a positive integer. When L=1, the CPM signal is called full response CPM. Otherwise it is called partial response CPM.

A CPM signal, s(t), may be decomposed into a superposition of PAM waveforms using the Laurent decomposition (paper "Decomposition of M-ary CPM Signals into PAM Waveforms" (Mengali U., and Morelli, M., IEEE Transactions on Information Theory, vol. 41, no. 5, 1995)), whenever the modulation index h is not an integer. This decomposition takes the following form.

$$s(t) = \sum_{k=0}^{Q-1} \sum_{n} b_{k,n} c_k(t-nT), \quad \text{(Equation 1)}$$

where $Q=2^{L-1}$, $c_k(t)$ are a set of pulses whose explicit definition is found in Eq (7) of paper "Decomposition of M-ary CPM Signals into PAM Waveforms" (Mengali U., and Morelli, M., IEEE Transactions on Information Theory, vol. 41, no. 5, 1995), and $b_{n,k}$ are the so-called pseudo-symbols. The pseudo-symbols, $b_{n,k}$, depend on the information symbols, $\alpha_k \in \{-1,1\}$, in a non-linear way. For a given $0 \le k \le 2^{L-1}$, the expansion of k in binary digits can be expressed as $$k = \sum_{i=1}^{L-1} 2^{i-1} \beta_{k,i},$$

for some binary coefficients $\beta_{k,i} \in \{0,1\}$. The pseudo-symbols are defined by $$b_{k,n} = \exp\left(j\pi h \left[\sum_{m \le n} \alpha_m - \sum_{i=0}^{L-1} \alpha_{n-i}\beta_{k,i}\right]\right). \quad \text{(Equation 2)}$$

The Laurent decomposition is not defined if h is an integer, see the paper "Decomposition of M-ary CPM Signals into PAM Waveforms" (Mengali U., and Morelli, M., IEEE Transactions on Information Theory, vol. 41, no. 5, 1995), Section II B.

Full response CPM (i.e. L=1) has a particularly simple Laurent decomposition, since $Q=2^{L-1}=1$. In this case, Equation 1 and Equation 2 yield that the CPM signal, s(t), may be expressed as $$s(t) = \sum_{n=0}^{N} \exp\left(j\pi h \sum_{m \le n} \alpha_m\right) c_0(t-nT). \quad \text{(Equation 3)}$$

Even though the Laurent decomposition of a partial response CPM signal is more complex than its full response counterpart, the expression in Equation 3 is approximately valid for partial response CPM signals in many cases of practical interest. These cases include the Gaussian Minimum Shift Keying (GMSK) modulations used in Global System for Mobile Communications (GSM) and Digital Enhanced Cordless Telecommunication (DECT). In general, Equation 3 provides an accurate representation of a partial response CPM signal whenever the energy, that is, the second norm, in the pulses $c_k(t)$, $1 \le k \le 2^{L-1}$, is much less than the energy in the main pulse $c_0(t)$.

Lindskoq-Paulraj (LP) Transmit Diversity

In "A Transmit Diversity Scheme for delay Spread Channels" (Pro. IEEE Int. Conf. Commun. (ICC 2000), June 2000), Lindskog and Paulraj developed a transmit diversity scheme for channels with dispersion. The diversity scheme achieves full second-order receive diversity with one receive antenna and two transmit antennas. A symbol stream d(t) of complex-valued symbols to be transmitted is fed to a space-time encoder. The space-time encoder divides the symbol stream into two symbol streams; $d_1(t)$ and $d_2(t)$, each symbol stream containing half of the symbols. The transmission frame is also divided into two blocks. The space-time encoder provides input to two transmitters. The space-time encoder transmits, during a first block of the transmission, the time reversed, negated and complex conjugated second symbol stream $-d_2^*(N-t)$ from a first transmit antenna, and the time reversed, complex conjugated first symbol stream $d_1^*(N-t)$ through a second transmit antenna. The encoder transmits, during a second block of the transmission, the first symbol stream $d_1(t)$ from the first transmit antenna and the second symbol stream $d_2(t)$ from the second transmit antenna. FIG. 1 schematically illustrates the transmit diversity according to Lindskog-Paulraj. Furthermore, the paper "A Transmit Diversity Scheme for delay Spread Channels" (Lindskog and Paulraj, in Pro. IEEE Int. Conf. Commun. (ICC 2000), June 2000) discloses the necessary receive processing.

SUMMARY

An object of embodiments herein is to provide a way of improving the performance in a wireless communications network.

According to a first aspect of embodiments herein, the object is achieved by a method in a transmitter for transmitting Continuous Phase Modulated, CPM, signals to a receiver. The transmitter and the receiver are comprised in a wireless communications network.

The transmitter divides a sequence of user code bits into a first bit sequence and a second bit sequence. The first and second bit sequences are of equal length.

Further, the transmitter duplicates the first bit sequence into a third bit sequence, and the second bit sequence into a fourth bit sequence. The transmitter further maps the first bit sequence and second bit sequence into a first layer corresponding to a first transmit antenna, and the third bit sequence and the fourth bit sequence into a second layer corresponding to a second transmit antenna.

Furthermore, the transmitter time reverses one of the respective first and second bit sequences in the first layer, and one of the respective third and fourth bit sequences in the second layer. The transmitter further maps 1 to 0 and 0 to 1 in one of the time reversed first or second time reversed bit sequence, or in one of the time reversed third or fourth bit sequence.

Yet further, the transmitter formats the first bit sequence and the second bit sequence into a first burst, and the third bit sequence and the fourth bit sequence into a second burst.

When a modulation index value, h, is a non-integer, the transmitter applies differential encoding to each of the respective first and second bursts.

The transmitter continuous phase modulates the respective first and second bursts; and transmits a first CPM signal through the first transmit antenna and a second CPM signal through the second transmit antenna, wherein the first CPM signal corresponds to the continuous phase modulated first burst, and the second CPM signal corresponds to the continuous phase modulated second burst.

According to a second aspect of embodiments herein, the object is achieved by a transmitter for transmitting CPM signals to a receiver. The transmitter and the receiver are comprised in a wireless communications network.

The transmitter comprises means adapted to divide a sequence of user code bits into a first bit sequence and a second bit sequence. The first and second bit sequences are of equal length.

Further, the means is adapted to duplicate the first bit sequence into a third bit sequence, and the second bit sequence into a fourth bit sequence; and to map the first bit sequence and the second bit sequence into a first layer corresponding to a first transmit antenna, and the third bit sequence and fourth bit sequence into a second layer corresponding to a second transmit antenna.

Furthermore, the means is adapted to time reverse one of the respective first and second bit sequences in the first layer, and one of the respective third and fourth bit sequences in the second layer; and to map 1 to 0 and 0 to 1 in one of the time reversed first or second time reversed bit sequence, or in one of the time reversed third or fourth bit sequence.

Yet further, the means is adapted to format the first bit sequence and second bit sequence into a first burst, and the third bit sequence and fourth bit sequence into a second burst.

When a modulation index value, h, is a non-integer, the means is adapted to apply differential encoding to each of the respective first and second bursts.

The means is further adapted to continuous phase modulate the respective first and second bursts; and to transmit a first CPM signal through the first transmit antenna and a second CPM signal through the second transmit antenna, wherein the first CPM signal corresponds to a continuous phase modulated first burst, and the second CPM signal corresponds to a continuous phase modulated second burst.

According to a third aspect of embodiments herein, the object is achieved by a method in a receiver for receiving a CPM signal from a transmitter. The receiver and the transmitter are comprised in a wireless communications network.

The receiver receives a CPM signal comprising a first received bit sequence in a first sample stream and a second received bit sequence in a second sample stream.

Further, the receiver derotates the received CPM signal by a derotation angle, which derotation angle depends upon a modulation index value, h.

When the modulation index value, h, is an integer, the receiver removes a deterministic component of the derotated CPM signal.

Furthermore, the receiver time reverses and complex conjugates a first sample stream.

Yet further, the receiver filters the respective first and second sample streams by means of a matched MIMO filter, whereby the respective first and second received bit sequences are decoupled.

The receiver continuous phase demodulates the respective first and second sample streams, whereby a sequence of user code bits comprised in the received CPM signal is obtained.

According to a fourth aspect of embodiments herein, the object is achieved by a receiver for receiving a CPM signal from a transmitter. The receiver and the transmitter are comprised in a wireless communications network.

The receiver comprises means adapted to receive a CPM signal comprising a first received bit sequence in a first sample stream and a second received bit sequence in a second sample stream; and to derotate the received CPM signal by a derotation angle, which derotation angle depends upon a modulation index value, h.

When the modulation index value, h, is an integer, the means is adapted to remove a deterministic component of the derotated CPM signal.

Further, the means is adapted to time reverse and complex conjugate the first sample stream, and to filter the respective first and second sample streams by means of a matched MIMO filter, whereby the respective first and second received bit sequences are decoupled.

Furthermore, the means is adapted to continuous phase demodulate the respective first and second sample streams, whereby a sequence of user code bits comprised in the received CPM signal is obtained.

Since the user code bits are processed and formatted into a first and second burst as described above, and since a first CPM signal corresponding to the continuous phase modulated first burst is transmitted through the first transmit antenna and a second CPM signal corresponding to the continuous phase modulated second burst is transmitted through the second transmit antenna, the reception quality of signals at the receiver is enhanced. This results in an improved performance in the wireless communications network.

BRIEF DESCRIPTION OF DRAWINGS

Examples of embodiments herein are described in more detail with reference to attached drawings in which:

FIG. 7 schematically illustrates embodiments of a first part of an exemplifying method in a transmitter;

FIG. 8 schematically illustrates embodiments of a second part of an exemplifying method in a transmitter.

DETAILED DESCRIPTION

Figure 1:
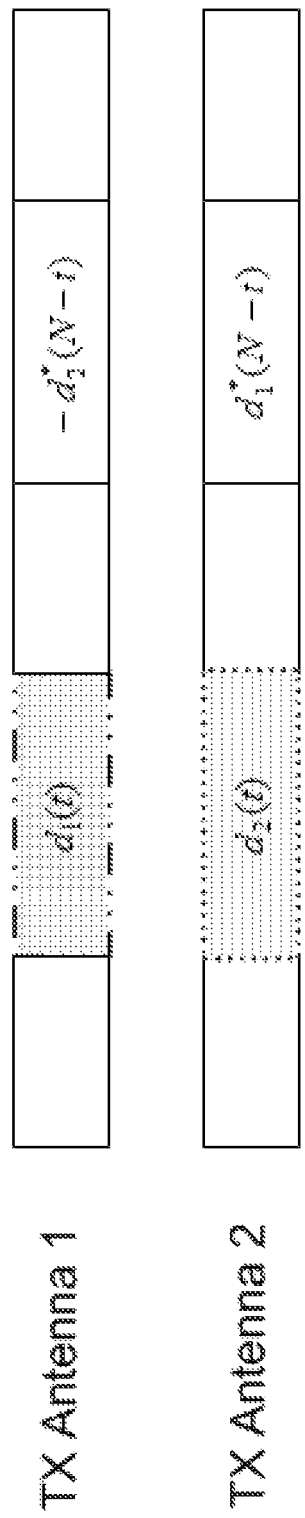
FIG. 1 schematically illustrates the Lindskog-Paulraj transmit diversity according to prior art.

As part of developing embodiments herein, some problems will first be identified and discussed. In order to improve the performance of a wireless communications network, it is desirable to apply transmit diversity techniques in time dispersive propagation environments. Especially, it is desirable to apply transmit diversity techniques in order to improve link performance between a transmitter, such as a base station, and a receiver, such as a terminal, without having to provide the receiver with any extra RF equipment. In addition, in many cases it is necessary or highly desirable to use Continuous Phase Modulation (CPM). However, the transmit diversity scheme disclosed in the prior art paper "A Transmit Diversity Scheme for Delay Spread Channels" (Lindskog and Paulraj, Proc. IEEE Int. Conf. Commun. (ICC 2000), June 2000) cannot be applied to non-linear CPM, since it was defined only for linear modulation schemes. Further, full rate space-time codes for non-linear CPM in channels with intersymbol interference are not previously known.

By the expression "full rate space-time codes" when used herein is meant that the code does not alter the symbol rate. In other words, symbols arrive at the transmitter at a given rate, e.g. a given number of symbols per second, and are output at the antenna at the same rate. This is in contrast to a repetition code wherein each symbol is repeated once, whereby the rate is reduced by 50 percent.

Some embodiments herein disclose a full rate transmit diversity scheme that provides full diversity gains for CPM signals. Full rate transmit diversity may be used with or without space-time codes. However, it is difficult to achieve both full rate at the transmitter and full diversity gains without the space-time code. Therefore, by the expression "full rate transmit diversity scheme" when used herein is meant full rate transmit diversity in combination with a novel space-time code. In other words, the "scheme" described in embodiments herein comprises a full rate space-time code.

Especially, some embodiments herein disclose a full rate transmit diversity scheme that provides full diversity gains for CPM signals in inter-symbol interference channels. The technique may be used to enhance the spectrum efficiency of the wireless communications system and thereby to improve the performance of the wireless communications network.

Some embodiments herein apply the Lindskog-Pulraj technique, which is defined for linear modulations, to non-linear CPM signals in order to improve the performance of the wireless communications network.

An advantage of embodiments herein is that they comprise a full rate transmit diversity scheme that provides full diversity gains for CPM signals. Especially, some embodiments herein discloses a full rate transmit diversity scheme that provides full diversity gains for CPM signals in inter-symbol interference channels. The technique may be used to enhance the spectrum efficiency of the wireless communications system and thereby to improve the performance of the wireless communications network.

Below, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Some embodiments herein disclose diversity transmission and reception methods for transmission and reception of one or more CPM signal, respectively. In some embodiments, the diversity transmission and reception methods for the one or more CPM signals are used in radio channels with InterSymbol interference (ISI). Intersymbol interference (ISI) is a form of distortion of a signal transmitted in the radio channel causing one symbol of the signal to interfere with subsequent symbols.

Figure 2:
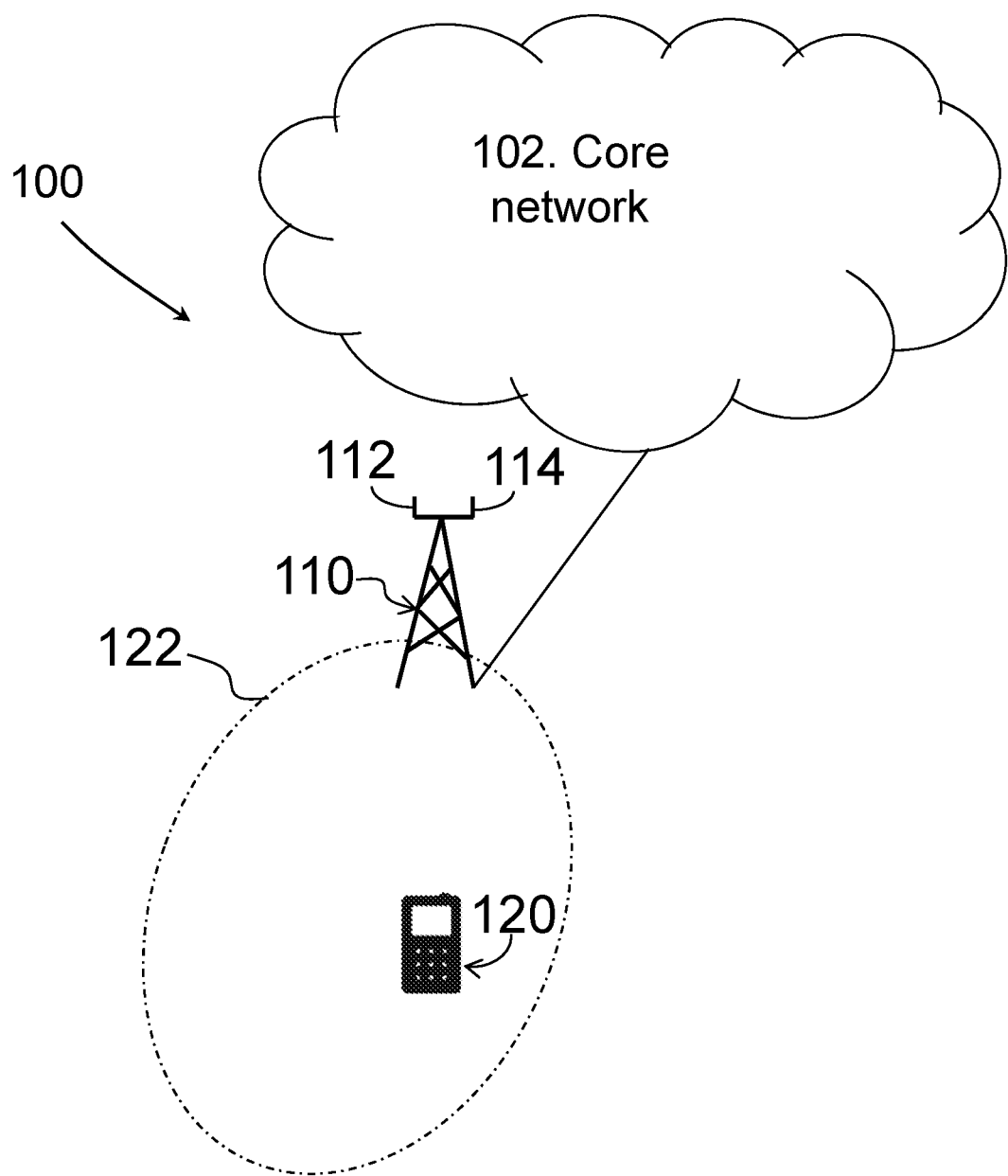
FIG. 2 schematically illustrates an embodiment of a wireless communications network.

As schematically illustrated in FIG. 2 embodiments herein relate to a wireless communication network 100. The wireless communications network 100 may be a wireless communication network such as an LTE, WCDMA, GSM network, any 3GPP cellular network, Wimax, or any cellular network or system.

The wireless communications network 100 comprises a transmitter 110 for transmitting continuous phase modulated signals to a receiver 120 located within a geographical area 122 served by the transmitter 110.

The transmitter 110 may be a transmission point such as a radio base station, for example an eNB, an eNodeB, or an Home Node B, an Home eNode B or any other network node capable to serve a user equipment or a machine type communication device in a wireless communications network. Further, the transmitter 110 may have a first transmit antenna 112 and a second transmit antenna 114. The transmitter 110 and the receiver 120 are comprised in a wireless communication network 100.

The receiver 120 such as a wireless device also referred to as a user equipment or UE is located in the wireless communication network 100. The receiver 120 may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

However, it should be understood that in some embodiments, the transmitter 110 is a wireless device such as a user equipment, and the receiver 120 is a radio base station or another network node capable of serving the user equipment.

Further, a core network 102 may be comprised in the wireless communication network 100 and connected to the transmitter 110.

It should be understood that the wireless communications network 100 may comprise a plurality of network nodes. However, only two network nodes, the transmitter 110 and the receiver 120, are depicted in FIG. 2.

Figure 3:
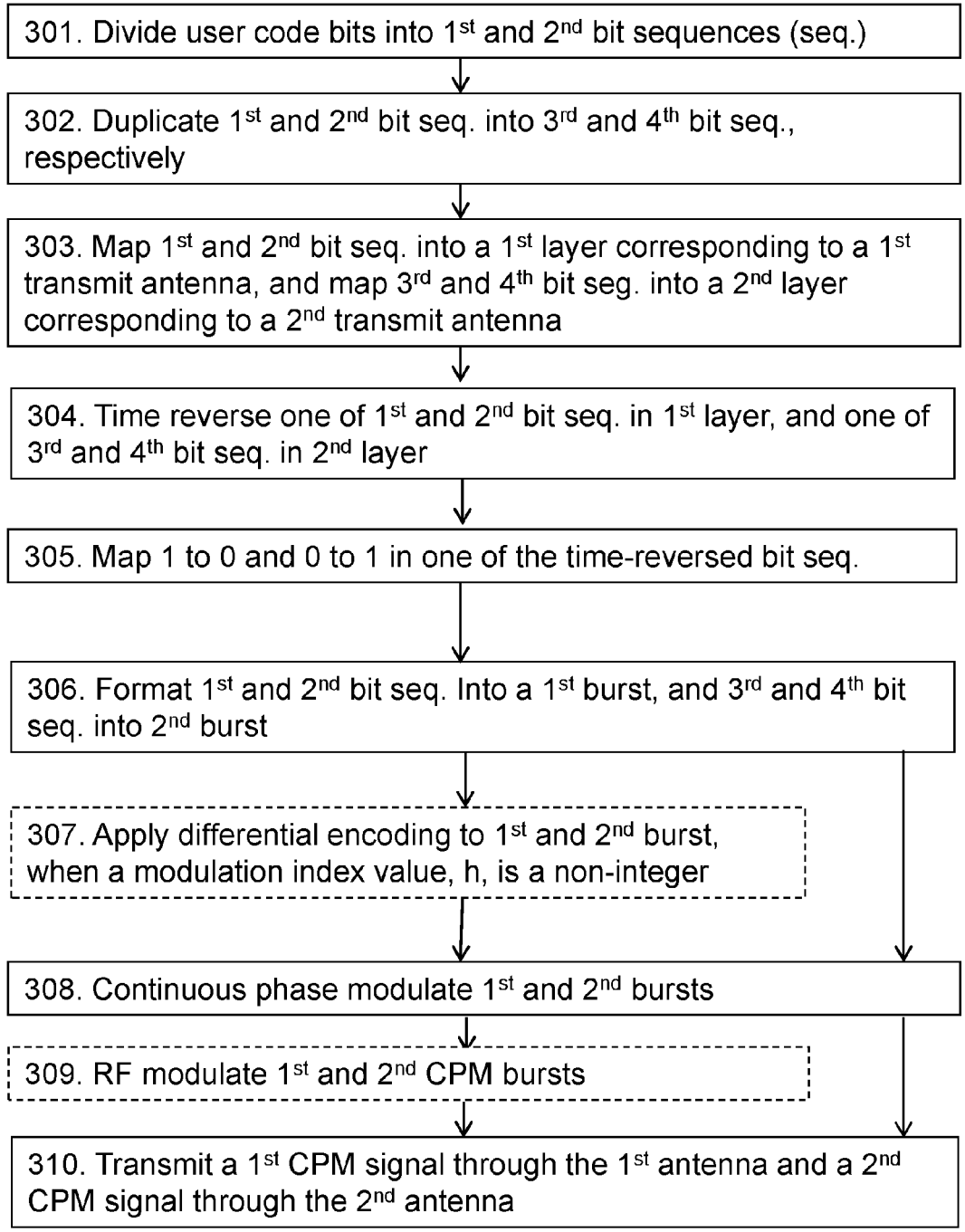
FIG. 3 is a flowchart depicting embodiments of a method in a transmitter.

A method in the transmitter 110 for transmitting CPM signals to the receiver 120 will now be described with reference to a flow chart depicted in FIG. 3. As mentioned above, the transmitter 110 and the receiver 120 are comprised in the wireless communications network 100. The method comprises one or more of the following actions. It should be understood that actions may be taken in another suitable order and that actions may be combined.

In order to pre-process user code bits to be transmitted from the transmitter 110 to the receiver 120, the transmitter 110 performs one or more of the Action 301-307 to be described below.

Action 301

The transmitter 110 divides a sequence of user code bits into a first bit sequence and a second bit sequence. The first and second bit sequences are of equal length. However, it should be understood that the user code bits are divided into two sequences in dependence of how the user code is constructed. Thus, the user code bits may be divided into the two sequences in another suitable way.

Further, the user code bits may be payload or parts thereof, which payload or parts thereof is to be transmitted from the transmitter 110 to the receiver 120. This may herein sometimes be referred to as grouping user code bits into two blocks.

Action 302

The transmitter 110 duplicates the first bit sequence into a third bit sequence, and the second bit sequence into a fourth bit sequence. This may sometimes herein be referred to as repetition of the blocks.

Action 303

In order to map the bit sequences to different antenna layers, the transmitter 110 maps the first bit sequence and second bit sequence into a first layer corresponding to the first transmit antenna 112, and the third bit sequence and the fourth bit sequence into a second layer corresponding to the second transmit antenna 114. This may sometimes herein be referred to as mapping to layers.

Action 304

The transmitter 110 time reverses one of the respective first and second bit sequences in the first layer, and time reverses one of the respective third and fourth bit sequences in the second layer. By time reversing is herein meant that the order of the bits in the bit sequences is changed so that the first bit will be the last bit in the time reversed bit sequence, the second bit will be the next to last bit of the time reversed bit sequence, . . . , and so that the last bit will be the first bit of the time reversed bit sequence.

Action 305

The transmitter 110 maps 1 to 0 and 0 to 1 in one of the time reversed first or second time reversed bit sequence, or one of the time reversed third or fourth bit sequence. This may sometimes herein be referred to as bit flipping.

Action 306

The transmitter 110 formats the first bit sequence and the second bit sequence into a first burst, and the third bit sequence and the fourth bit sequence into a second burst. Herein this may sometimes be referred to as burst formatting.

As previously mentioned, the first bit sequence comprises the first half of the user code bits and the second bit sequence comprises the second half of the user code bits. Further, as also previously mentioned, one of the first and second bit sequences has been time reversed and possibly also bit flipped. Thus, the first burst will comprise the first and second bit sequences, wherein one of them have been time reversed and possibly also bit flipped. In correspondence, the second burst will comprise the third and fourth bit sequences, wherein one of them have been time reversed and possibly also bit flipped. Consequently, both the first and the second burst will comprise all user code bits.

In some embodiments, the transmitter 110 performs the formatting into a first burst by appending tail bits to the beginning of the first bit sequence, appending tail bits to the end of the second bit sequence, and inserting training sequence bits in between the first and second bit sequences. Further, the transmitter 110 may perform the formatting into a second burst by appending tail bits to the beginning of the third bit sequence, appending tail bits to the end of the fourth bit sequence, and inserting training sequence bits in between the third and fourth bit sequences. The tail bits may be identical in both the first and second layers.

In some embodiments, after formatting, the respective first and second burst has the following format, from left to right: firstly, tail bits; secondly, user code bits; thirdly, training sequence bits; fourthly, user code bits; and finally, tail bits.

Action 307

The transmitter 110 applies differential encoding to each of the respective first and second bursts, when a modulation index value, h, is a non-integer. Herein this may sometimes be referred to as differential encoding of the formatted bursts in dependence of a modulation index value, h.

Action 308

The transmitter 110 continuous phase modulate the respective first and second bursts. This is performed to obtain continuous phase modulated bursts which bursts are to be transmitted to the receiver 120.

Action 309

In order to obtain first and second CPM signals, which are upmixed to a predetermined or predefined radio frequency, the transmitter 110 may Radio Frequency (RF) modulate the continuous phase modulated first burst and the continuous phase modulated second burst.

Action 310

The CPM signals is then to be transmitted to the receiver 120. Thus, the transmitter 110 transmits a first CPM signal through the first transmit antenna 112 and a second CPM signal through the second transmit antenna 114. The first CPM signal corresponds to the continuous phase modulated first burst, and the second CPM signal corresponds to the continuous phase modulated second burst.

In some embodiments, the transmitter 110 also performs amplification before transmission of the CPM signals through the two transmit antennas.

Figure 4:
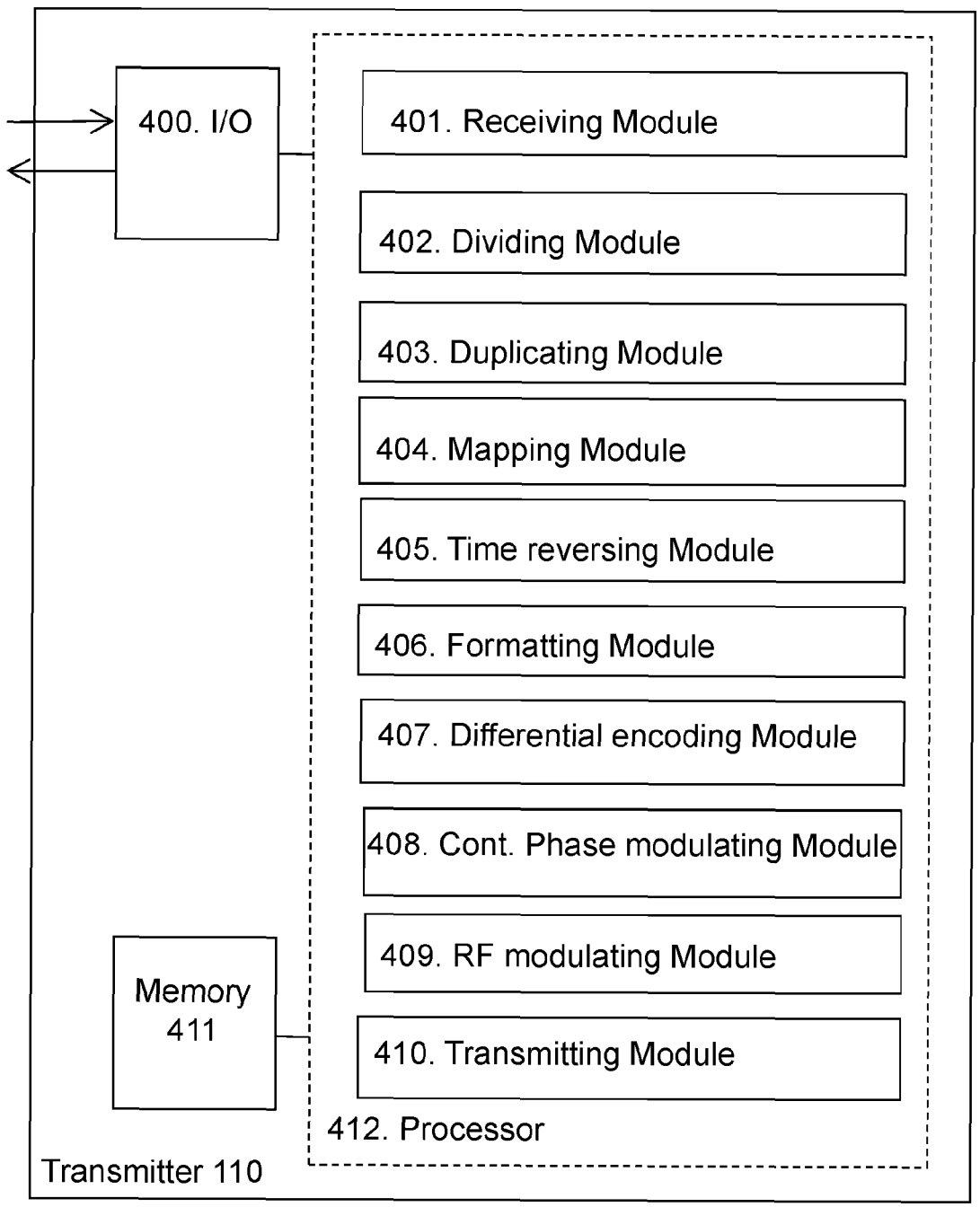
FIG. 4 is a schematic block diagram illustrating embodiments of a transmitter.

To perform the method for transmitting Continuous Phase Modulated (CPM) signals to the receiver 120, the transmitter 110 may comprise an arrangement depicted in FIG. 4. As previously mentioned, the transmitter 110 and the receiver 120 are comprised in the wireless communications network 100.

In some embodiments, the transmitter 110 comprises an input and/or output interface 400 configured to communicate with one or more other communication devices, one or more other transmitters, or one or more other receivers, such as the receiver 120.

The transmitter 110 may comprise a receiving module 401 configured to receive information such as e.g. user code bits from the one or more other transmitter 110 or the one or more other receiver 120. The receiving module 401 may be a wireless receiver of the transmitter 110.

The transmitter 110 comprises means, such as e.g. a dividing module 402, adapted to divide a sequence of user code bits into a first bit sequence and a second bit sequence. As previously mentioned, the first and second bit sequences are of equal length.

The dividing module 402 may be implemented as a processor 412 of the transmitter 110.

Further, the transmitter 110 comprises means, such as e.g. a duplicating module 403, adapted to duplicate the first bit sequence into a third bit sequence, and the second bit sequence into a fourth bit sequence.

The duplicating module 403 may be implemented as the processor 412 of the transmitter 110.

Furthermore, the transmitter 110 comprises means, such as e.g. a mapping module 404, adapted to map the first bit sequence and the second bit sequence into the first layer corresponding to the first transmit antenna 112, and the third bit sequence and fourth bit sequence into the second layer corresponding to the second transmit antenna 114.

The mapping module 404 may be implemented as the processor 412 of the transmitter 110.

Yet further, the transmitter 110 comprises means, such as e.g. a time reversing module 405, adapted to time reverse one of the respective first and second bit sequences in the first layer, and one of the respective third and fourth bit sequences in the second layer.

The time reversing module 405 may be implemented as the processor 412 of the transmitter 110.

The transmitter 110 comprises also means, such as e.g. the mapping module 404, adapted to map 1 to 0 and 0 to 1 in one of the time reversed first or second bit sequence, or in one of the time reversed third or fourth bit sequence.

Further, the transmitter 110 comprises means, such as e.g. a formatting module 406, adapted to format the first bit sequence and the second bit sequence into a first burst, and the third bit sequence and the fourth bit sequence into a second burst.

In some embodiments, the means adapted to format further is adapted to append tail bits to the beginning of the first bit sequence, appending tail bits to the end of the second bit sequence, and inserting training sequence bits in between the first and second bit sequences. Further, the means adapted to format may be adapted to append tail bits to the beginning of the third bit sequence, appending tail bits to the end of the fourth bit sequence, and inserting training sequence bits in between the third and fourth bit sequences. The tail bits may be identical in both the first and second layers. After formatting the respective first and second burst may have the following format, from left to right: firstly, tail bits; secondly, user code bits; thirdly, training sequence bits; fourthly, user code bits; and finally, tail bits.

The formatting module 406 may be implemented as the processor 412 of the transmitter 110.

Furthermore, the transmitter 110 may comprise means, such as e.g. a differential encoding module 407, adapted to apply differential encoding to each of the respective first and second bursts when a modulation index value, h, is a non-integer.

The differential encoding module 407 may be implemented as the processor 412 of the transmitter 110.

Yet further, the transmitter 110 comprises means, such as e.g. a continuous phase modulating module 408, adapted to continuous phase modulate the respective first and second bursts.

The continuous phase modulating module 408 may be implemented as the processor 412 of the transmitter 110.

The transmitter 110 may comprise means, such as e.g. an RF modulating module 409, adapted to Radio Frequency (RF) modulate the continuous phase modulated first burst and the continuous phase modulated second burst.

The RF modulating module 409 may be implemented as the processor 412 of the transmitter 110.

Further, the transmitter 110 comprises means, such as e.g. a transmitting module 410, adapted to transmit a first CPM signal through the first transmit antenna 112 and a second CPM signal through the second transmit antenna 114, wherein the first CPM signal corresponds to the continuous phase modulated first burst, and the second CPM signal corresponds to the continuous phase modulated second burst.

The transmitting module 410 may be a wireless transmitter of the transmitter 110.

The transmitter 110 may also comprise means for storing data such as user code data. In some embodiments, the transmitter 110 comprises a memory 411 configured to store the data. The user code data, e.g. user code bits, may be processed or non-processed user code data or data and/or information relating thereto. The memory 411 may comprise one or more memory units. Further, the memory 411 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the transmitter 110.

Embodiments herein for transmitting CPM signals to the receiver 120 may be implemented through one or more processors, such as the processor 412 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the in the transmitter 110. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the transmitter 110.

Those skilled in the art will also appreciate that the receiving module, dividing module, duplicating module, mapping module, time reversing module, formatting module, differential encoding module, continuous phase modulating module, RF modulating module and transmitting module described above may refer to a combination of analog and digital circuits, and/or one or more processors configured with software and/or firmware, e.g. stored in the memory, that when executed by the one or more processors such as the processors in the transmitter 110 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 5:
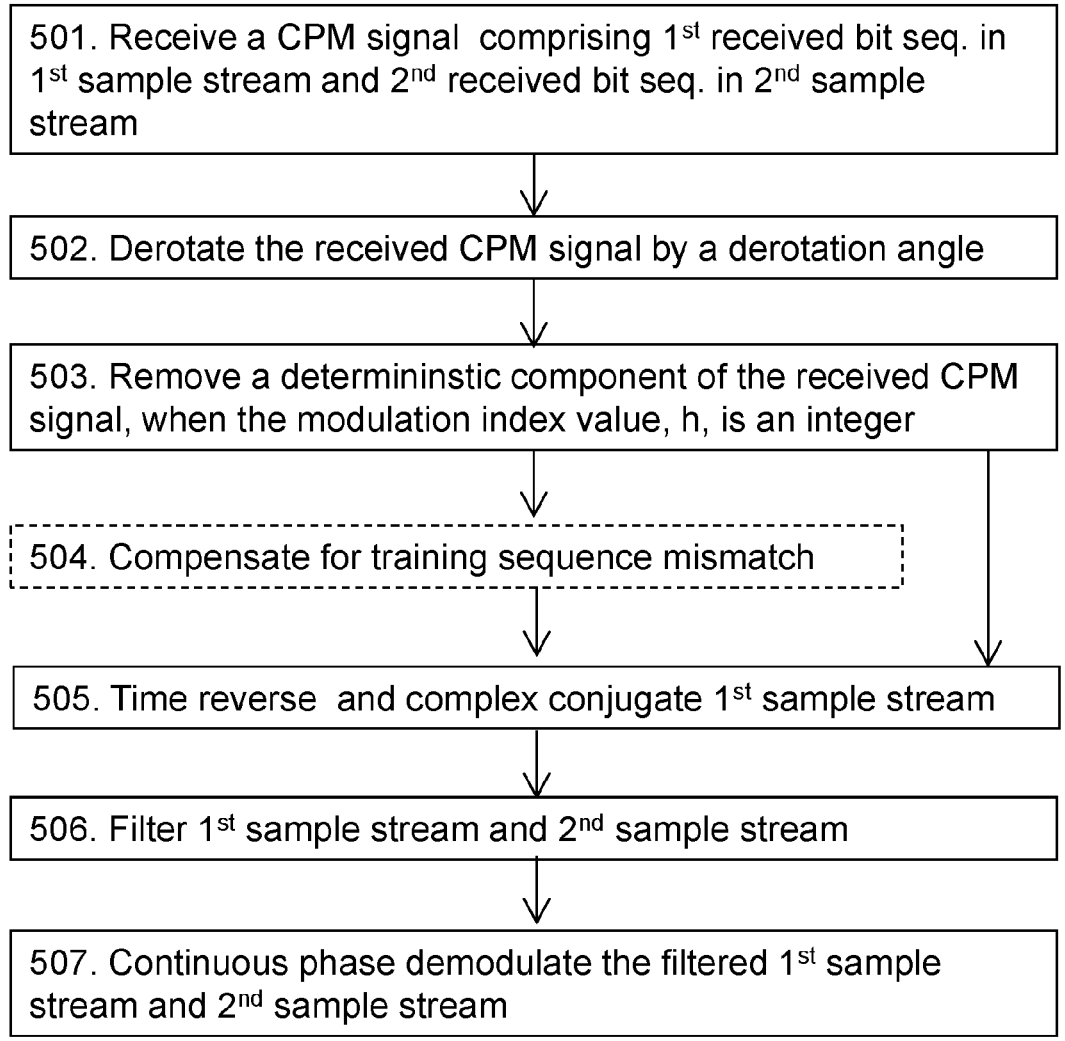
FIG. 5 is a flowchart depicting embodiments of a method in a receiver.

A method in the receiver 120 for receiving a CPM signal from the transmitter 110 will now be described with reference to a flow chart depicted in FIG. 5. As mentioned above, the transmitter 110 and the receiver 120 are comprised in the wireless communications network 100. The method comprises one or more of the following actions. It should be understood that actions may be taken in another suitable order and that actions may be combined.

Action 501

The receiver 120 receives a CPM signal comprising a first received bit sequence in a first sample stream and a second received bit sequence in a second sample stream.

In some embodiments, the received signal is downconverted to baseband and digitized by the receiver 120.

The received CPM signal may comprise the first and second CPM signals transmitted from the transmitter 110. In some embodiments, the received CPM signal is a superposition of the first and second CPM signals.

Action 502

The receiver 120 derotates the received CPM signal by a derotation angle. The derotation angle depends upon a modulation index value, h.

In some embodiments, the derotation angle depends upon the modulation index value, h, such that the derotation $$\text{derotation angle} = \begin{cases} -\pi/2 & \text{if } h = H + 0.5 \text{ and } H \text{ even} \\ \pi/2 & \text{if } h = H + 0.5 \text{ and } H \text{ odd} \\ \pi & \text{if } h = 1 \end{cases},$$

wherein H is a non-negative integer.

Action 503

The receiver 120 removes a deterministic component of the derotated CPM signal when the modulation index value, h, is an integer. The deterministic component may be a constant. By removing the deterministic component from the signal, any component(-s) of the signal that is/are independent of the modulating bits is/are removed.

Action 504

In some embodiments, the receiver 120 compensates for training sequence mismatch when the K first bits of a first training sequence, $t^1$, of the first received bit sequence are different from the time-reversed and flipped last K bits of a second training sequence, $t^2$, of the second received bit sequence. This is the case when $t^1_k \neq 1-(t^2_{P+1-k})$ for $k=1, \ldots, K-1$, wherein K is an integer larger than 0 and P is the number of training bits.

Further, the receiver 120 compensates for training sequence mismatch when the K first bits of the first training sequence, $t^1$, of the first received bit sequence are different from the time reversed K last bits of the second training sequence, $t^2$, of the second received bit sequence. This is the case when $t^2_k \neq 1-(t^1_{P+1-k})$ for $k=1, \ldots, K-1$, wherein K is an integer larger than 0 and P is the number of training bits.

Action 505

The receiver 120 time reverses and complex conjugates the first sample stream. The time reversing is performed since the first half of the signal transmitted from the transmitter 110 has been time reversed, cf. Action 304 described above, and Action 706 together with FIG. 7 which will be described below.

Action 506

The receiver 120 filters the respective first and second sample streams, whereby the respective first and second received bit sequences are decoupled.

The receiver 120 may perform so-called Multiple-Input Multiple-Output (MIMO) matched filtering of the first and second sample streams in order to decouple the respective first and second received bit sequences. This may also be referred to as the receiver 120 applies a matched MIMO filter to the respective first and second received bit sequences in order to decouple the respective first and second received bit sequences.

In some embodiments, the receiver 120 filters the respective first and second sample streams as will described in Equation 18 below. By the term "decoupled" when used herein is meant that after filtering, one sample stream depends only on the first half of the user code bits, while the other sample stream depends only on the second half of the user code bits. Before filtering the first sample stream depends on both the first and second half of the user code bits.

Action 507

The receiver 120 continuous phase demodulates the respective first and second sample streams. This may also be expressed as the receiver 120 performs continuous phase demodulation of the respective first and second sample streams. Thereby, a sequence of user code bits comprised in the received CPM signal is obtained.

To perform the method for receiving a CPM signal from the transmitter 110, the receiver 120 may comprise an arrangement depicted in FIG. 4. As previously mentioned, the transmitter 110 and the receiver 120 are comprised in the wireless communications network 100.

In some embodiments, the receiver 120 comprises an input and/or output interface 600 configured to communicate with one or more other communication devices, one or more other transmitters, such as the transmitter 110, or one or more other receivers.

The receiver 120 comprises means adapted to receive a CPM signal comprising a first received bit sequence in a first sample stream and a second received bit sequence in a second sample stream.

In some embodiments, the receiver 120 comprises a receiving module 601 configured to receive the CPM signal. The receiving module 601 may be a wireless receiver of the receiver 120. As previously mentioned, the received CPM signal may comprise the first and second CPM signals transmitted from the transmitter 110. In some embodiments, the received CPM signal is a superposition of the first and second CPM signals.

Further, the receiver 120 comprises means, such as e.g. a derotating module 602, adapted to derotate the received CPM signal by a derotation angle, which derotation angle depends upon a modulation index value, h. The derotation angle may depend upon the modulation index value, h, such that the derotation angle $$\text{derotation angle} = \begin{cases} -\pi/2 & \text{if } h = H + 0.5 \text{ and } H \text{ even} \\ \pi/2 & \text{if } h = H + 0.5 \text{ and } H \text{ odd} \\ \pi & \text{if } h = 1 \end{cases},$$

wherein H is a non-negative integer.

The derotating module 602 may be implemented as a processor 610 of the receiver 120.

Further, the receiver 120 comprises means, such as e.g. a removing module 603, adapted to remove a deterministic component of the derotated CPM signal, when the modulation index value, h, is an integer.

The removing module 603 may be implemented as the processor 610 of the receiver 120.

Furthermore, the receiver 120 comprises means, such as e.g. a compensating module 604, adapted to compensate for training sequence mismatch when the K first bits of a first training sequence, $t^1$, of the first received bit sequence are different from the time-reversed and flipped last K bits of a second training sequence, $t^2$, of the second received bit sequence. This is the case when $t^1_k \neq 1-(t^2_{P+1-k})$ for $k=1, \ldots, K-1$, wherein K is an integer larger than 0 and P is the number of training bits.

Further, the means is adapted to compensate for training sequence mismatch when the K first bits of the first training sequence, $t^1$, of the first received bit sequence are different from the time reversed K last bits of the second training sequence, $t^2$, of the second received bit sequence. This is the case when $t^2_k \neq 1-(t^1_{P+1-k})$ for k=1, ..., K-1, wherein K is an integer larger than 0 and wherein P is the number of training bits.

The compensating module 604 may be implemented as the processor 610 of the receiver 120.

Yet further, the receiver 120 comprises means, such as e.g. a time reversing and complex conjugating module 605, adapted to time reverse and complex conjugate the first sample stream.

The time reversing and complex conjugating module 605 may be implemented as the processor 610 of the receiver 120.

Also, the receiver 120 comprises means, such as e.g. a filtering module 606, adapted to filter the respective first and second sample streams, whereby the respective first and second received bit sequences are decoupled. The means adapted to filter the respective first and second sample stream may be adapted to filter the respective sample streams by means of a matched MIMO filter.

The filtering module 606 may be implemented as the processor 610 of the receiver 120.

Further, the receiver 120 comprises means, such as e.g. a continuous phase demodulating module 607, adapted to continuous phase demodulate the respective first and second sample streams, whereby a sequence of user code bits comprised in the received CPM signal is obtained.

The continuous phase demodulating module 607 may be implemented as the processor 610 of the receiver 120.

Further, the receiver 120 may comprise means, such as e.g. a transmitting module 608, adapted to transmit e.g. a signal to one or more other receiver.

The transmitting module 608 may be a wireless transmitter of the receiver 120.

The receiver 120 may also comprise means for storing data such as user code data. In some embodiments, the receiver 120 comprises a memory 609 configured to store the data. The user code data may be processed or non-processed user code data or data and/or information relating thereto. The memory 609 may comprise one or more memory units. Further, the memory 609 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the transmitter 110.

Figure 6:
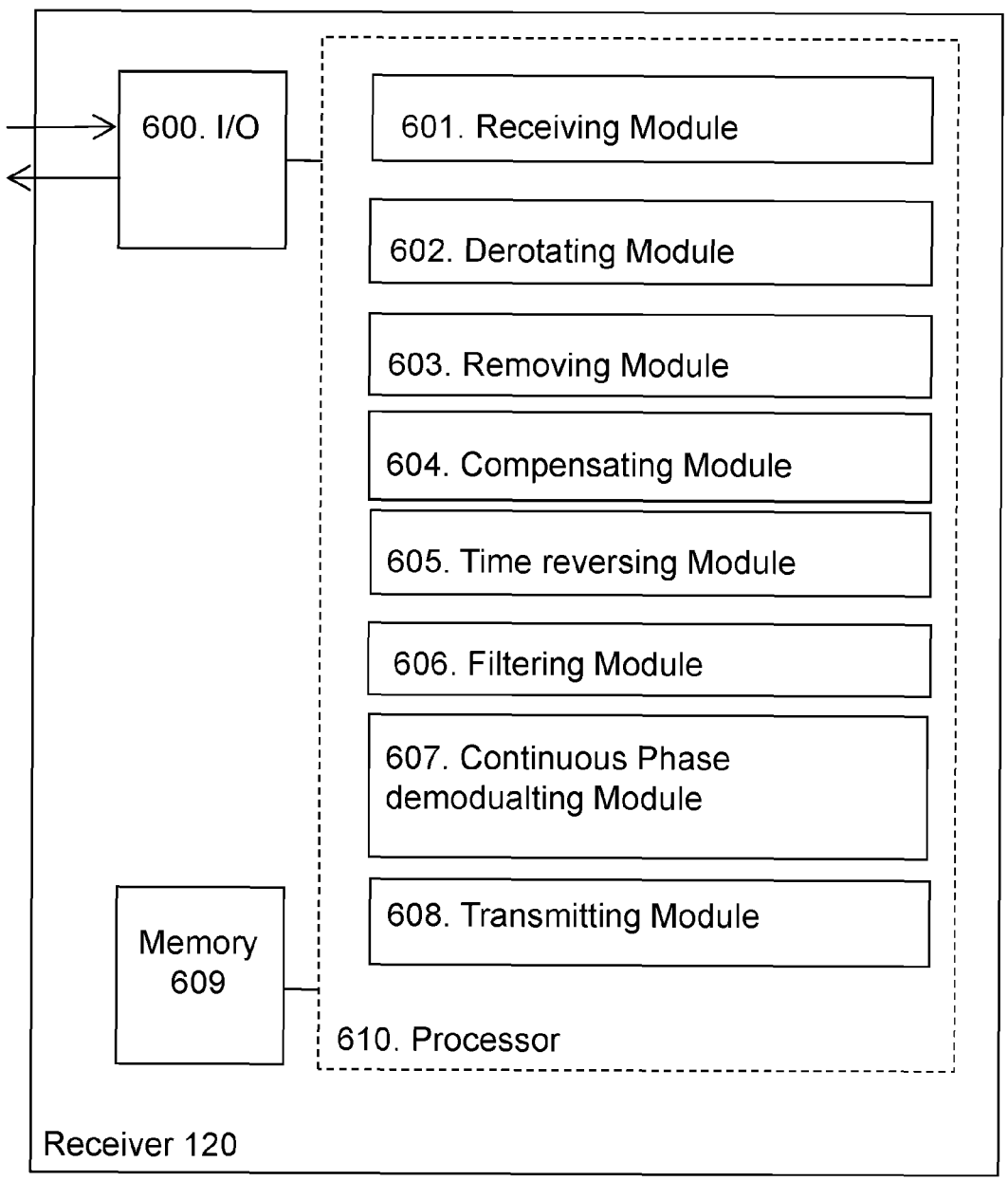
FIG. 6 is a schematic block diagram illustrating embodiments of a receiver.

Embodiments herein for receiving CPM signals from the transmitter 110 may be implemented through one or more processors, such as a processor 610 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the in the receiver 120. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the receiver 120.

Those skilled in the art will also appreciate that the receiving module, derotating module, removing module, compensating module, time reversing module, filtering module, continuous phase demodulating module and transmitting module above may refer to a combination of analog and digital circuits, and/or one or more processors configured with software and/or firmware, e.g. stored in the memory, that when executed by the one or more processors such as the processors in the receiver 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Exemplifying embodiments of methods in the transmitter 110 and in the receiver 120 will be described below. Firstly, exemplifying embodiments of the method in the transmitter 110 will be described with reference to FIGS. 7 and 8, wherein Actions 701-706 are shown in FIG. 7 and Actions 707-709 are shown in FIG. 8. Secondly, exemplifying embodiments of a method in the receiver 120 will be described with reference to FIG. 9.

Exemplifying Embodiments of the Method in the Transmitter 110

Modulation Index $$h = \frac{1}{2}H,$$

For H being an Integer and H>0

Some embodiments of the method in the transmitter 110 described herein apply to CPM, wherein the modulation index, h, is of the form $$h = \frac{1}{2}H,$$

and wherein H>0 is an integer. In other words, the values of the modulation index, h, that are considered in some embodiments are h=0.5,1,1.5, . . . .

As mentioned above, exemplifying embodiments of a method in the transmitter 110 is schematically illustrated in FIG. 7 and FIG. 8. FIG. 7 schematically illustrates embodiments of a first part of the transmitter processing and FIG. 8 schematically illustrates embodiments of a second part of the transmitter processing.

A sequence $\{a_k\}_{k=0}^{2N-1}$ of user code bits, e.g. the payload, is received from higher layers. For example, the payload may be received from a channel encoder (not shown). This payload is the input to the transmitter 110. For example, the payload may be the input to a space-time encoder of the transmitter 110. In some embodiments, the space-time encoder may be realised by one or more of the receiving module 401, the dividing module 402, the duplicating module 403, the mapping module 404, the time reversing module 405, the formatting module 406 and/or the differential encoding module 407 described above. The actions performed by the transmitter 110, e.g. by the space-time encoder, may be described in the following actions which relates to one or more of the actions 301-310 described above. As previously mentioned, actions may be taken in another suitable order and/or may be combined.

Action 701

The payload, e.g. user code bits, is divided into two blocks, e.g. sequences, of equal length. This relates to Action 301 previously described and may be performed by the dividing module 402.

Action 702

The two sequences are repeated, whereby four sequences are obtained. This relates to Action 302 previously described and may be performed by the duplicating module 403.

Action 703

The four sequences are mapped to two layers or antennas, e.g., to a first layer corresponding to the first transmit antenna 112 and to a second layer corresponding to the second transmit antenna 114. The two sequences containing the same half of the payload bits are mapped into two different layers. This relates to Action 303 previously described and may be performed by the mapping module 404.

Action 704

In some embodiments, one of the two sequences in each layer is time reversed. This relates to Action 304 previously described and may be performed by the time reversing module 405.

Action 705

In some embodiments, one of the time reversed sequences is bit flipped. Flipping a bit a means mapping a→1−a. In other words, 0 is mapped to 1 and 1 is mapped to 0. This relates to Action 305 previously described and may be performed by the mapping module 404.

Action 706

Two bursts in the two layers are formatted. The burst in the first layer may be referred to as a first burst and the burst in the second layer may be referred to as a second burst. Thus, a first burst is formatted for the first transmit antenna 112 and a second burst is formatted for the second transmit antenna 114. This relates to Action 306 previously described and may be performed by the formatting module 406.

For GSM/EDGE systems, this means that guard bits and/or tail bits are appended at the beginning and end, and that training sequence bits are inserted in the middle. Herein reference will sometimes only be made to tail bits. However, it should be understood that guard bits may be used instead, or that both tail bits and guard bits may be used. Tail bits refer to predefined bits usually chosen to shape the signal in some specific way, while guard bits are usually just fillers whose value is not important.

The tail bits to the left will be denoted by $\{g_k\}_{k=-M}^{-1}$ and the tail bits to the right by $\{g_k\}_{k=1}^{M}$, wherein M is the number of tail bits to the left or the number of tail bits to the right.

In some embodiments, both sequences of guard and/or tail bits are identical in both layers. In addition, layer specific training sequences $\{t_k^x\}_{k=1}^{P}$, x=1,2, wherein P is the number of training bits, may be inserted in the middle of the burst. The formatted burst has the following format, from left to right, firstly tail/guard bits, secondly, a first block of payload bits, thirdly, training sequence bits, fourthly, a second block of payload bits, and finally tail/guard bits.

Without loss of generality we may assume that $g_{-M}=0$.

Action 707

Differential encoding is applied separately to each of the formatted bursts, cf. FIG. 8. The application of the differential code is dependent upon the value of the modulation index, h. If the modulation index h is an integer then differential encoding is not applied. Otherwise, when the modulation index h is a non-integer, the differential encoding is applied. This relates to Action 307 previously described and may be performed by the differential encoding module 407. As illustrated in FIG. 8, the differential encoding module 407 is herein sometime also referred to as a differential encoder.

Action 708

The respective first and second bursts are separately CPM modulated. This relates to the Action 308 previously described and may be performed by the continuous phase modulating module 408. As illustrated in FIG. 8, the continuous phase modulating module 408 is herein sometimes also referred to as a CPM modulator.

Action 709

The respective first and second CPM modulated bursts may be sent to respective RF modulators for RF modulation and transmission of the RF modulated bursts through the respective first and second transmit antennas. This relates to the respective Actions 309 and 310 previously described and may be performed by the RF modulating module 409 and the transmitting module 410. As illustrated in FIG. 8, the RF modulating module 409 is herein sometimes also referred to as a RF modulator.

Exemplifying Embodiments of the Method in the Receiver 120

Full Response CPM with Modulation Index h=1

Consider full response CPM, i.e. L=1, with modulation index h=1. Before describing embodiments of the method performed by the receiver 120, some theory to motivate the proposed methodology will be described. Firstly, it will be described how to model the signal when there is only one transmit antenna, and secondly, embodiments of a receiver method will be described when embodiments of the transmit method described above with two transmit antennas have been used.

Figure 9:
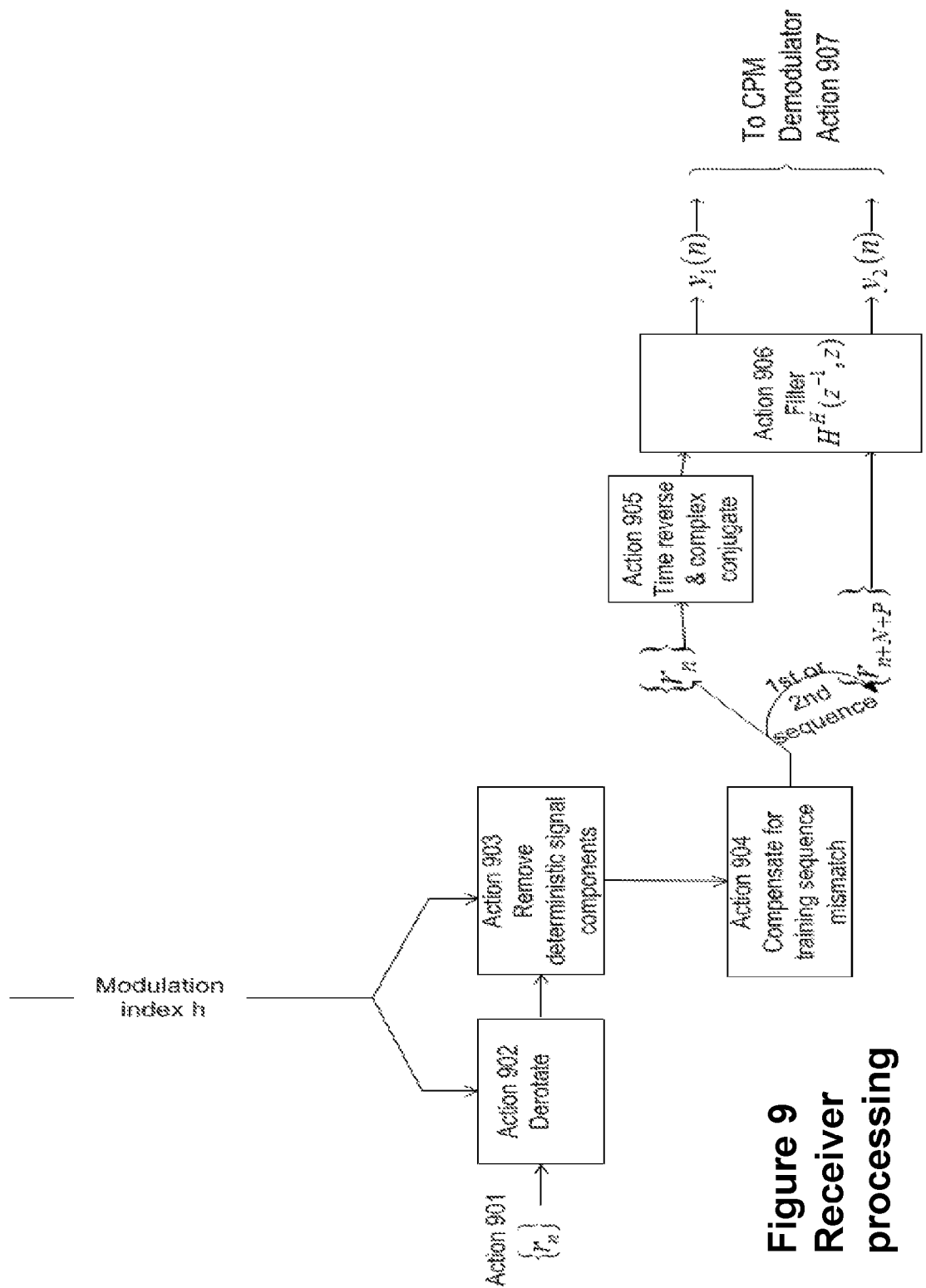
FIG. 9 schematically illustrates embodiments of an exemplifying method in a receiver.

FIG. 9 schematically illustrates embodiments of the method in a receiver 120.

I. One Transmit Antenna

Assume that the transmitter 110 described above is used, but that only one layer is transmitted. That is, only one transmit antenna is used for transmission. However, it does not matter which layer, i.e. which transmit antenna that is used. Thus, the first transmit antenna 112 or the second transmit antenna 114 may be used for transmission. The formatted burst, including the guard, tail and training bits will be denoted $\{b_k\}_{k=-M}^{2N+P+M-1}$. For example, if the first layer is transmitting, e.g. the first transmit antenna 112, sometimes herein referred to as TX antenna 1, then $b_{-M}=g_{-M}$, $b_0=a_{2N-1}$, $b_{N-1}=a_{N-1}$, and $b_N=t_1^1$. The information symbols are then given by $B_k=1-2b_k$, $-M \le k \le 2N+P+M-1$, wherein M is the number of tail bits to the left or the number of tail bits to the right, N is half the number of user code bits, and P is the number of training bits.

Recall that differential encoding is not applied at the transmitter 110 for integer modulation indices, cf. Action 307 and Action 707 described above. In addition, as explained above, the Laurent decomposition is not well defined if the modulation index h=1. However, the signal may be written as the product of two CPM signals with h=0.5, see [Equation (64) in the paper "Decomposition of M-ary CPM Signals into PAM Waveforms" (Mengali U., and Morelli, M., IEEE Transaction on Information Theory, vol. 41, no. 5, 1995). Indeed, it is clear that $$s(t) = \exp\left(j\pi \sum_i B_i q(t-iT)\right) \cdot \exp\left(j\pi \sum_i B_i q(t-iT)\right). \quad \text{(Equation 4)}$$

The Laurent decomposition may be applied to each of the two terms on the right hand side of Equation 4. After expanding and simplifying, the following expression, Equation 5 below, is obtained (see "Decomposition of M-ary CPM Signals into PAM Waveforms" (Mengali U., and Morelli, M., IEEE Transaction on Information Theory, vol. 41, no. 5, 1995) Section III C for complete details.)

$$s(t) = \underbrace{\sum_n (-1)^n g_0(t-nT)}_{\text{independent of the information symbols}} + \sum_n -j(-1)^n B_n g_1(t-nT), \quad \text{(Equation 5)}$$

where $g_0$ and $g_1$ are two pulses explicitly described in "Decomposition of M-ary CPM Signals into PAM Waveforms" (Mengali U., and Morelli, M., IEEE Transaction on Information Theory, vol. 41, no. 5, 1995) Section III C.

Next, assume that p(t) denotes the baseband equivalent of the convolution of the time dispersive propagation radio channel with the receiver filter. Then, the continuous time received signal, $\tilde{r}(t)$, may be expressed in the form $$\tilde{r}(t) = s*p(t) = \sum_n (-1)^n g_0^* p(t-nT) + \sum_n -j(-1)^n B_n g_1^* p(t-nT) + \tilde{w}(t), \quad \text{(Equation 6)}$$

where $\tilde{w}(t)$ models noise and interference and * denotes convolution. Defining $\tilde{h}=g_1*p$, $u=g_0*p$, and sampling at the instants t=kT, it is seen that Equation 6 may be re-written in the following way $$\tilde{r}(kT) = \sum_n (-1)^n u((k-n)T) + \sum_n -j(-1)^n B_n \tilde{h}((k-n)T) + \tilde{w}(kT). \quad \text{(Equation 7)}$$

Note that Equation 7 is a discrete time model for the received signal. Set $\tilde{r}_k \overset{\Delta}{=} \tilde{r}(kT)$, $u_k \overset{\Delta}{=} u(kT)$, $\tilde{h}_k \overset{\Delta}{=} \tilde{h}(kT)$, $\tilde{w}_k \overset{\Delta}{=} \tilde{w}(kT)$ and find an integer K such that both $\tilde{h}_k=0$ and $u_k=0$ if k≥K. This is possible since both the radio channel and the receiver filter are considered to be finite impulse response filters. Then, re-arranging the sums, Equation 7 may be re-written as Equation 8:

$$\tilde{r}_n = \sum_{k=0}^{K-1} (-1)^{n-k} u_k + \sum_{k=0}^{K-1} -j(-1)^{n-k} B_{n-k} \tilde{h}_k + \tilde{w}_n. \quad \text{(Equation 8)}$$

Now the received signal according to Equation 8 may be derotated by a derotation angle equal to π radians. This relates to Action 502 described above and to Actions 901 and 902 schematically illustrated in FIG. 9.

$$\bar{r}_n \overset{\Delta}{=} (-1)^{-n} \tilde{r}_n = \quad \text{(Equation 9)}$$

$$\underbrace{\sum_{k=0}^{K-1} (-1)^{-k} u_k + \sum_{k=0}^{K-1} -j(-1)^{-k} B_{n-k} \tilde{h}_k}_{\text{constant term}} + (-1)^{-n} \tilde{w}_n.$$

Finally, defining $h_k \overset{\Delta}{=} -j(-1)^{-k}\tilde{h}_k$, $$\mu = \sum_{k=0}^{K-1} (-1)^{-k} u_k$$

and $w_n \overset{\Delta}{=} (-1)^{-n}\tilde{w}_n$ the signal model according to Equation 10 below is obtained.

$$\bar{r}_n = \mu + \sum_{k=0}^{K-1} B_{n-k} h_k + w_n. \quad \text{(Equation 10)}$$

Observe that μ is a constant that depends on the radio channel. Therefore, the next step in the receiver chain is to subtract the deterministic part of the signal, i.e. to subtract the constant μ depending on the radio channel from the signal. This relates to Action 503 described above and is schematically illustrated as Action 903 in FIG. 9. Thus, with $r_n \overset{\Delta}{=} \bar{r}_n - \mu$, we arrive at the signal model $$r_n = \sum_{k=0}^{K-1} B_{n-k} h_k + w_n. \quad \text{(Equation 11)}$$

Employing the Z transform notation, Equation 11 is equivalent to $$r_n = (z^{-1}) B_n + w_n. \quad \text{(Equation 12)}$$

This relates to the Actions 501-503 described above.

Ib. Two Transmit Antennas

Assumed that the exemplifying method of transmitter 110 described in FIG. 7 and FIG. 8 is being used. Let $h_1$ and $h_2$ denote the discrete equivalent channels between the first transmit antenna 112 (sometimes referred to as TX antenna 1) and the receiver 120, and between the second transmit antenna 114 (sometimes referred to as TX antenna 2) and the receiver 120, respectively. The notation for the discrete equivalent channels, $h_1$ and $h_2$, should not be mixed up with the notation for the modulation index, h. Further, define the information symbols, $A_n$, as $A_n=1-2a_n$, wherein $(a_n)_{n=0}^{2N-1}$ are the payload bits, e.g. the user code bits.

Using the signal model of Equation 10 and the superposition principle, it is seen that the signal, $\tilde{r}_n$, received at the receiver 120 during the first half burst, that is, the part of the burst corresponding to the first half of the payload, is given by Equation 13:

$$\tilde{r}_n = \qquad \text{(Equation 13)}$$

$$\mu_1 + \mu_2 + h_1(z^{-1})\underbrace{(-A_{2N-n-1})}_{\text{time reversal+bit flip}} + h_2(z^{-1})\underbrace{A_{N-n-1}}_{\text{time reversal}} + w_n,$$

wherein
$0 \leq n \leq N-1$. This relates to Action 501 described above, and is schematically illustrated in FIG. 9 as the flow between the Actions 904 and 905.

There are two constant terms $\mu_1$ and $\mu_2$ since there are two radio channels. Subtracting the constant terms, i.e. subtracting the deterministic parts from the signal, cf. Action 503 described above and Action 903 of FIG. 9, $r_n \stackrel{\Delta}{=} \tilde{r}_n - \mu_1 - \mu_2$ we obtain $$r_n = h_1(z^{-1})\underbrace{(-A_{2N-n-1})}_{\text{time reversal+bit flip}} + h_2(z^{-1})\underbrace{A_{N-n-1}}_{\text{time reversal}} + w_n, \quad \text{(Equation 14)}$$

wherein $0 \leq n \leq N-1$.

Equivalently, applying time reversal and complex conjugation, which relates to Action 505 described above and to Action 905 schematically illustrated in FIG. 9, to Equation 14 we obtain $$r_{N-n-1}^* = -h_1^*(z)A_{N+n} + h_2^*(z)A_n + w_{N-n-1}^*, 0 \leq n \leq N-1. \quad \text{(Equation 15)}$$

Similarly, the signal received during the second half burst, i.e. corresponding to the second half of the payload, is $$r_{N+P+n} = h_1(z^{-1})A_n + h_2(z^{-1})A_{N+n} + w_{N+P+n}, 0 \leq n \leq N-1. \quad \text{(Equation 16)}$$

Equation 16 relates to the result obtained after performing the Actions 501-504 described above. Note that Equation 15 and Equation 16 are identical to what would be obtained using LP transmit diversity and real valued symbols $A_n$. Equations 15 and 16 may be expressed in concise matrix form according to Equation 17 below.

$$\begin{bmatrix} r_{N-n-1}^* \\ r_{N+P+n} \end{bmatrix} = \underbrace{\begin{bmatrix} h_2^*(z) & -h_1^*(z) \\ h_1(z^{-1}) & h_2(z^{-1}) \end{bmatrix}}_{H(z,z^{-1})} \begin{bmatrix} A_n \\ A_{N+n} \end{bmatrix} + \begin{bmatrix} w_{N-n-1}^* \\ w_{N+P+n} \end{bmatrix}. \quad \text{(Equation 17)}$$

Just as in the LP methodology, the matrix $H(z,z^{-1})$ is orthogonal, in the sense that $$H(z,z^{-1})^H H(z,z^{-1}) = \qquad \text{(Equation 18)}$$

$$(h_1^*(z)h_1(z^{-1}) + h_2^*(z)h_2(z^{-1}))\begin{bmatrix} 1 & 0 \\ 0 & 1 \end{bmatrix}, \text{ so}$$

$$\begin{bmatrix} y_1(n) \\ y_2(n) \end{bmatrix} \stackrel{\Delta}{=} H^H(z^{-1},z)\begin{bmatrix} r_{N-n-1}^* \\ r_{N+n} \end{bmatrix}$$

$$= (h_1^*(z)h_1(z^{-1}) + h_2^*(z)h_2(z^{-1}))\begin{bmatrix} 1-2a_n \\ 1-2a_{N+n} \end{bmatrix} +$$

$$H^H(z^{-1},z)\begin{bmatrix} w_{N-n-1}^* \\ w_{N+P+n} \end{bmatrix}.$$

Equation 18 shows that the two half bursts have been decoupled and that full diversity gain is obtained ("A Transmit Diversity Scheme for delay Spread Channels" (Lindskog and Paulraj, in Pro. IEEE Int. Conf. Commun. (ICC 2000), June 2000)). When used herein, decoupling means that the first sample stream after filtering $y_1$ depends only on the first half of the user code bits $(a_n)_{n=0}^{N-1}$, while the second sample stream after filtering $y_1$ depends only on the second half of the user code bits $(a_n)_{n=N}^{2N-1}$.

The filtering operation applied in Equation 18 comprises the application of a matched Multiple-Input Multiple-Output (MIMO) filter $H^H(z^{-1},z)$ to the first sample stream and to the time reversed and complex conjugated second sample stream. This relates to Action 506 described above and to Action 906 schematically illustrated in FIG. 9.

Ic. Compensation of Mismatched Training Sequences

This relates to Action 504 described above. In order for the demodulator, e.g. the continuous phase demodulating module 607 previously described, to operate properly on $y_1(n)$ and $y_2(n)$, the first K-1 symbols of the training sequence on the first transmit antenna 112 must be related to the last K-1 bits/symbols of the training sequence on the second transmit antenna 114 by $$t_k^1 = 1 - (t_{P+1-k}^2) \text{ for } k=1,\ldots,k-1, \qquad \text{(Equation 19)}$$

and the last K-1 bits/symbols of the training sequence on the first transmit antenna 112 must be related to the first K-1 bits/symbols of the training sequence on the second transmit antenna 114 by $$t_k^2 = 1 - (t_{P+1-k}^1) \text{ for } k=1,\ldots,K-1 \qquad \text{(Equation 20)}$$

However, most training sequences with good auto-correlation and cross-correlation properties, such as those used by GSM systems, do not have the relationship described in Equation 19 and Equation 20. For training sequences that do not satisfy Equation 19 or Equation 20, the performance of the demodulator will be limited by an error floor due to the mutual interference from both transmit antennas 112,114 at the beginning of each payload.

Define the sequences $$u_1(k) \equiv -(1-2 \cdot t_{P+1-k}^2) - (1-2 \cdot t_k^1), \text{ for } k=1,2,\ldots,K-1$$

and $$u_2(k) \equiv (1-2 \cdot t_{P+1-k}^1) - (1-2 \cdot t_k^2), \text{ for } k=1,2,\ldots,K-1$$

which may be pre-computed and stored in the receiver 120 or in a memory connected to or arranged in communication with the receiver 120. After the channel estimation is performed, the following sequence may be computed:

$$\Delta_n \equiv \qquad \text{(Equation 21)}$$

$$\begin{cases} h_1(n)*u_1(n) + h_2(n)*u_2(n) & \text{for } n = 1, 2, \ldots, K-1 \\ 0 & \text{elsewhere} \end{cases}$$

where $h_1(n)$ and $h_2(n)$ are the channel estimate of the first and second layers, respectively. The potential mismatch of training sequence may be compensated by replacing $r_n$ in Equation 14 by $r_n - \Delta_{n+1-N}$. With the new definition of $r_n$ in Equation 14, a conventional demodulator may be used to optimally demodulate $a_n$ based on the resulting $y_1(n)$ and $y_2(n)$ computed as in Equation 18.

II. CPM with Modulation Index h=0.5+H, H an Even Integer

Consider the case where the modulation index, h, is of the form h=H+0.5, where H is an even integer, e.g. H=0,2,4, . . . . Firstly, it will be described how to model the signal when there is only one transmit antenna and secondly, the receiver processing when the transmit processing is as described in FIG. 7 and FIG. 8 with two transmit antennas will be described. Recall that since the modulation index, h, is not an integer, the transmitter 110 has applied differential encoding, cf. Actions 307 and 707. Also, reliance is made on the Laurent decomposition Equation 3, which is only an approximation in the case of partial response CPM.

IIa. One Transmit Antenna

Assume that the transmitter 110 of FIGS. 7 and 8 is used, but only one layer is transmitting. That is, only one transmit antenna, e.g. the first transmit antenna 112 or the second transmit antenna 114, is used for transmission. However, it does not matter which layer is transmitting. The formatted burst, comprising the guard, tail and/or training bits, but before differential encoding, may be denoted $\{b_k\}_{k=-M}^{2N+P+M-1}$. For example, if the first layer is transmitted, e.g. TX antenna 1, then $b_{-M}=g_{-M}$, $b_0=a_{2N-1}$, $b_{N-1}=a_{N-1}$, and $b_N=t_1^1$. Let $\{\beta_k\}_{k=-M}^{2N+P+M-1}$ be the formatted burst after differential encoding. That is, $\beta_{-M}=b_{-M}$, $\beta_k=b_k \oplus b_{k-1}$, $-M<k\leq 2N+P+M-1$. The information symbols are then given by $\alpha_k=1-2\beta_k$, $-M\leq k\leq 2N+P+M-1$.

With this notation, the transmitted signal, s(t), has the form $$s(t) = \sum_{n=-M}^{2N+P+M-1} \exp\left(j\pi h \sum_{m\leq n} \alpha_m\right) c_0(t-nT). \quad \text{(Equation 22)}$$

Define $J \triangleq \exp(j\pi h)$. Since the modulation index $h=H+0.5$ with H is an even integer then $J=\exp(j\pi(H+0.5))=\exp(j\pi \cdot 0.5)=j$. Now, using the properties of the exponential, Equation 22 may be re-written as $$s(t) = \sum_n j^{\sum_{m\leq n} \alpha_m} c_0(t-nT) = \sum_n \prod_{m\leq n} j^{\alpha_m} c_0(t-nT). \quad \text{(Equation 23)}$$

Observing that $\alpha_m \in \{-1,1\}$ implies $j^{\alpha_m}=\alpha_m j$, Equation 23 may be further simplified.

$$s(t) = \sum_n \prod_{m\leq n} \alpha_m j c_0(t-nT) = \sum_n j^n \prod_{m\leq n} \alpha_m c_0(t-nT). \quad \text{(Equation 24)}$$

Since differential encoding has been applied to the modulating bits $\{b_k\}$, and since we moreover have chosen $b_{-m}=g_{-M}=0$, we see that the information symbols are $\alpha_{-M}=1-2b_{-M}=1$, and $\alpha_n=1-2(b_n \oplus b_{n-1})=(1-2b_{n-1})\cdot(1-2b_{n-1})$, $n>-M$.

Hence $$\prod_{m\leq n} \alpha_m = (1-2b_{-M})(1-2b_n)\prod_{k=-M+1}^{n-1}(1-2b_k)^2 = \quad \text{(Equation 25)}$$

$$(1-2b_{-M})(1-2b_n) = 1-2b_n.$$

Setting $B_n=1-2b_n$ and inserting Equation 25 into Equation 24 we obtain $$s(t) = \sum_n j^n B_n c_0(t-nT). \quad \text{(Equation 26)}$$

Next, start with the model defined by Equation 26 and assume that p(t) is the baseband equivalent of the convolution of the time dispersive propagation radio channel with the receiver filter. Then, the continuous time received signal $\tilde{r}(t)$ may be expressed in the form $$\tilde{r}(t) = \sum_n j^n B_n c_0^* p(t-nT) + \tilde{w}(t), \quad \text{(Equation 27)}$$

where $\tilde{w}(t)$ models noise and interference and * denotes convolution. Defining $\tilde{h}=c_0^* p$ and sampling at the instants t=kT we arrive at $$\tilde{r}(kT) = \sum_n j^n B_n \tilde{h}((k-n)T) + \tilde{w}(kT). \quad \text{(Equation 28)}$$

Set $\tilde{r}_k \triangleq \tilde{r}(kT)$, $\tilde{h}_k \triangleq \tilde{h}(kT)$, $\tilde{w}_k \triangleq \tilde{w}(kT)$ and find an integer K such that $\tilde{h}_k=0$ if $k\geq K$. Then, by re-arranging the sums, Equation 28 may be re-written as $$\tilde{r}_n = \sum_{k=0}^{K-1} j^{n-k} B_{n-k} \tilde{h}_k + \tilde{w}_n. \quad \text{(Equation 29)}$$

The next step is to apply derotation by an derotation angle equal to $-\pi/2$ radians. This relates to Action 502. Defining $r_n \triangleq j^{-n}\tilde{r}_n$, $h_k \triangleq j^{-k}\tilde{h}_k$ and $w_n \triangleq j^{-n}\tilde{w}_n$ the following signal model is obtained $$r_n = \sum_{k=0}^{K-1} B_{n-k} h_k + w_n \quad \text{(Equation 30)}$$

IIb. Two Transmit Antennas

Assume that the exemplifying method of the transmitter 110 described in FIGS. 7 and 8 is being used. As in Section Ib above, let $h_1$ and $h_2$ denote the discrete equivalent channels between the first transmit antenna 112 (sometimes referred to as TX antenna 1) and the receiver 120, and between the second transmit antenna 114 (sometimes referred to as TX antenna 2) and the receiver 120, respectively. Also, define $A_n=1-2a_n$. Using the signal model Equation 30 and the Z transform notation, together with the superposition principle, it may be seen that the signal, $r_n$, received at the receiver 120 during the first half burst, i.e. the signal corresponding to user code bits, is given by Equation 31 below.

$$r_n = \underbrace{-h_1(z^{-1})A_{2N-n-1}}_{\text{time reversal+bit flip}} + h_2(z^{-1})\underbrace{A_{N-n-1}}_{\text{time reversal}} + w_n, \quad \text{(Equation 31)}$$

$0\leq n\leq N-1$.

In Equation 31 the received samples depend on the information symbols $A_{N-n-1}$ and $A_{2N-n-1}$, which are related to the user code bits by the equation $A_n=1-2a_n$. In summary the first sample stream $r_n$ in Equation 31 depends on the first bit sequence $a_{2N-n-1}$, n=0 . . . 2N-1.

Similarly, the signal, $r_{N+P+n}$, received during the second half burst, i.e. also corresponding to user code bits, is given by Equation 32 below.

$$r_{N+P+n} = h_1(z^{-1})A_n + h_2(z^{-1})A_{N+n} + w_{N+P+n}, 0 \leq n \leq N-1. \quad \text{(Equation 32)}$$

Thus, the second sample stream $r_{N+P+n}$ in Equation 32 depends on the second bit sequence $a_{n_1}$ n=0 . . . 2N−1. So the first and second bit sequences are the time reversal of each other. They are different as sequences, but clearly are related.

Applying complex conjugation and time reversal to Equation 31 and Equation 32 may be expressed in concise matrix form as follows.

$$\begin{bmatrix} r^*_{N-n-1} \\ r_{N+P+n} \end{bmatrix} = \underbrace{\begin{bmatrix} h^*_2(z) & -h^*_1(z) \\ h_1(z^{-1}) & h_2(z^{-1}) \end{bmatrix}}_{H(z,z^{-1})} \begin{bmatrix} A_n \\ A_{N+n} \end{bmatrix} + \begin{bmatrix} w^*_{N-n-1} \\ w_{N+P+n} \end{bmatrix}. \quad \text{(Equation 33)}$$

Just as in the Lindskog-Paulraj methodology, the matrix $H(z,z^{-1})$ is an orthogonal in the sense that $$H(z, z^{-1})^H H(z, z^{-1}) = (h^*_1(z)h_1(z^{-1}) + h^*_2(z)h_2(z^{-1})) \begin{bmatrix} 1 & 0 \\ 0 & 1 \end{bmatrix},$$

and $A_0^2 = 1$, so $$\begin{bmatrix} y_1(n) \\ y_2(n) \end{bmatrix} \triangleq H^H(z^{-1}, z) \begin{bmatrix} r^*_{N-n-1} \\ r_{N+P+n} \end{bmatrix} = \quad \text{(Equation 34)}$$

$$(h^*_1(z)h_1(z^{-1}) + h^*_2(z)h_2(z^{-1})) \begin{bmatrix} 1 & 0 \\ 0 & 1 \end{bmatrix} \begin{bmatrix} 1 - 2a_n \\ 1 - 2a_{N+n} \end{bmatrix} +$$

$$H^H(z^{-1}, z) \begin{bmatrix} w^*_{N-n-1} \\ w_{N+P+n} \end{bmatrix},$$

where the superscript$^H$ denotes the transpose and complex conjugation of the coefficients in $H(z,z^{-1})$, but not of the variables $z$ and $z^{-1}$. Equation 34 shows that the two half bursts have been decoupled and that full diversity gain is obtained (Lindskog and Paulraj, "A Transmit Diversity Scheme for delay Spread Channels", in Pro. IEEE Conf. Comm. (ICC 2000), June 2000). As previously mentioned, decoupling means that the first sample stream after filtering, $y_1$, depends only on the first half of the user code bits $(a_n)_{n=0}^{N-1}$, while the second sample stream after filtering, $y_2$, depends only on the second half of the user code bits $(a_n)_{n=N}^{2N-1}$.

Further, the filtering operation applied in Equation 34 comprises the application of a matched MIMO filter $H^H(z^{-1},z)$ to the first sample stream and to the time reversed and complex conjugated second sample stream.

III. CPM with Modulation Index h=H+0.5, H an Odd Integer

Consider the case where the modulation index, h, is of the form h=H+0.5, where H is an odd integer. Firstly, it will be described how to model the signal when there is only one transmit antenna 112, 114, and secondly, the receiver processing will be described when the transmit processing described in relation to FIGS. 7 and 8 with two transmit antennas has been used. Recall that since the modulation index, h, is not an integer, the transmitter 110 has applied differential encoding to the formatted burst. We shall rely on the Laurent decomposition Equation 3, which, as previously mentioned, is only an approximation in the case of partial response CPM.

This case is very similar to the case discussed in Section II above, so below only the main differences will be highlighted.

IIIa. One Transmit Antenna

Equation 22 is the starting point. However, since the modulation index h=H+0.5 with H is an odd integer then $J \stackrel{\Delta}{=} \exp(j\pi h) = -j$. Equation 23 becomes $$s(t) = \sum_n (-j)^{\sum_{m \leq n} \alpha_m} c_0(t - nT). \quad \text{(Equation 35)}$$

Observing that $\alpha_k \in \{-1, 1\}$ implies $(-j)^{\alpha_m} = -\alpha_m j$, we obtain, instead of Equation 26, $$s(t) = \sum_{n=0}^{N} (-j)^n B_n c_0(t - nT), \quad \text{(Equation 36)}$$

After radio channel filtering, receive filtering and analog to digital conversion, the discrete time model according to Equation 37 below is obtained.

$$\tilde{r}_n = \sum_{k=0}^{K-1} (-j)^{n-k} B_{n-k} \tilde{h}_k + \tilde{w}_n = \sum_{k=0}^{K-1} j^{k-n} B_{n-k} \tilde{h}_k + \tilde{w}_n \quad \text{(Equation 37)}$$

The next step is to apply derotation by a derotation angle equal to $\pi/2$ radians. This relates to Action 502 described above. Defining $r_n \stackrel{\Delta}{=} j^n \tilde{r}_n$, $h_k \stackrel{\Delta}{=} j^k \tilde{h}_k$ and $w_n \stackrel{\Delta}{=} j^n \tilde{w}_n$ the following signal model is obtained $$r_n = \sum_{k=0}^{K-1} B_{n-k} h_k + w_n. \quad \text{(Equation 38)}$$

IIIb. Two Transmit Antennas

Note that the signal model Equation 38 is identical to Equation 30. Therefore, the processing of the received signal, after derotation by a derotation angle equal to $-\pi/2$ radians, is identical to the processing described above in section IIb Two transmit antennas when modulation index h=H+0.5, H an even integer.

When using the word "comprise" or "comprising" herein it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a transmitter for transmitting Continuous Phase Modulated (CPM) signals to a receiver, wherein the transmitter and the receiver are comprised in a wireless communications network, and wherein the method comprises:

dividing a sequence of user code bits into a first bit sequence and a second bit sequence, wherein the first and second bit sequences are of equal length;

duplicating the first bit sequence into a third bit sequence, and the second bit sequence into a fourth bit sequence;

mapping the first bit sequence and second bit sequence into a first layer corresponding to a first transmit antenna, and the third bit sequence and the fourth bit sequence into a second layer corresponding to a second transmit antenna;

time reversing one of the respective first and second bit sequences in the first layer, and one of the respective third and fourth bit sequences in the second layer;

mapping 1 to 0 and 0 to 1 in one of the time reversed first or second time reversed bit sequence, or in one of the time reversed third or fourth bit sequence;

formatting the first bit sequence and the second bit sequence into a first burst, and the third bit sequence and the fourth bit sequence into a second burst;

when a modulation index value, h, is a non-integer, applying differential encoding to each of the respective first and second bursts;

continuous phase modulating the respective first and second bursts; and transmitting a first CPM signal through the first transmit antenna and a second CPM signal through the second transmit antenna, wherein the first CPM signal corresponds to the continuous phase modulated first burst, and the second CPM signal corresponds to the continuous phase modulated second burst.

2. The method of claim 1, wherein the formatting comprises:

appending tail bits to the beginning of the first bit sequence, appending tail bits to the end of the second bit sequence, and inserting training sequence bits in between the first and second bit sequences; and appending tail bits to the beginning of the third bit sequence, appending tail bits to the end of the fourth bit sequence, and inserting training sequence bits in between the third and fourth bit sequences.

3. The method of claim 2, wherein the tail bits are identical in both the first and second layers.

4. The method of claim 2, wherein the respective first and second burst has the following format, from left to right: firstly, tail bits;
secondly, user code bits; thirdly, training sequence bits; fourthly, user code bits; and
finally, tail bits.

5. The method of claim 1, further comprising:
radio frequency (RF) modulating the continuous phase modulated first burst and the continuous phase modulated second burst.

6. A transmitter for transmitting Continuous Phase Modulated (CPM) signals to a receiver, wherein the transmitter and the receiver are comprised in a wireless communications network, and wherein the transmitter comprises means adapted to:

divide a sequence of user code bits into a first bit sequence and a second bit sequence, wherein the first and second bit sequences are of equal length;

duplicate the first bit sequence into a third bit sequence, and the second bit sequence into a fourth bit sequence;

map the first bit sequence and the second bit sequence into a first layer corresponding to a first transmit antenna, and the third bit sequence and fourth bit sequence into a second layer corresponding to a second transmit antenna;

time reverse one of the respective first and second bit sequences in the first layer, and one of the respective third and fourth bit sequences in the second layer;

map 1 to 0 and 0 to 1 in one of the time reversed first or second time reversed bit sequence, or in one of the time reversed third or fourth bit sequence;

format the first bit sequence and second bit sequence into a first burst, and the third bit sequence and fourth bit sequence into a second burst;

when a modulation index value, h, is a non-integer, apply differential encoding to each of the respective first and second bursts;

continuous phase modulate the respective first and second bursts; and transmit a first CPM signal through the first transmit antenna and a second CPM signal through the second transmit antenna, wherein the first CPM signal corresponds to a continuous phase modulated first burst, and the second CPM signal corresponds to a continuous phase modulated second burst.

7. The transmitter of claim 6, wherein the means adapted to format further is adapted to:

append tail bits to the beginning of the first bit sequence, appending tail bits to the end of the second bit sequence, and inserting training sequence bits in between the first and second bit sequences; and append tail bits to the beginning of the third bit sequence, appending tail bits to the end of the fourth bit sequence, and inserting training sequence bits in between the third and fourth bit sequences.

8. The transmitter of claim 7, wherein the tail bits are identical in both the first and second layers.

9. The transmitter of claim 7, wherein the respective first and second burst has the following format, from left to right: firstly, tail bits; secondly, user code bits; thirdly, training sequence bits; fourthly, user code bits; and finally, tail bits.

10. The transmitter of claim 6, further comprising means adapted to radio frequency (RF) modulate the continuous phase modulated first burst and the continuous phase modulated second burst.

11. A method in a receiver for receiving a CPM signal from a transmitter, wherein the receiver and the transmitter are comprised in a wireless communications network, and wherein the method comprises:

receiving a CPM signal comprising a first received bit sequence in a first sample stream and a second received bit sequence in a second sample stream;

derotating the received CPM signal by a derotation angle, which derotation angle depends upon a modulation index value, h;

when the modulation index value, h, is an integer, removing a deterministic component of the derotated CPM signal;

time reversing and complex conjugating the first sample stream;

filtering the respective first and second sample streams by means of a matched Multiple-Input Multiple-Output filter, whereby the respective first and second received bit sequences are decoupled; and continuous phase demodulating the respective first and second sample streams, whereby a sequence of user code bits comprised in the received CPM signal is obtained.

12. The method of claim 11, wherein the received CPM signal comprises a first and a second CPM signal.

13. The method of claim 11 or 12, further comprising:
compensating for training sequence mismatch when the K first bits of a first training sequence, $t^1$, of the first received bit sequence are different from the time-reversed and flipped last K bits of a second training sequence, $t^2$, of the second received bit sequence, that is when $t^1_k \neq 1-(t^2_{P+1-k})$ for k=1, ..., K-1, and when the K first bits of the first training sequence, $t^1$, of the first received bit sequence are different from the time reversed K last bits of the second training sequence, $t^2$, of the second received bit sequence, that is when $t^2_k \neq 1-(t^1_{P+1-k})$ for k=1, ..., K-1, wherein K is an integer larger than 0 and wherein P is the number of training bits.

14. The method of claim 11, wherein the derotation angle depends upon the modulation index value, h, such that the $$\text{derotation angle} = \begin{cases} -\pi/2 & \text{if } h = H + 0.5 \text{ and } H \text{ even} \\ \pi/2 & \text{if } h = H + 0.5 \text{ and } H \text{ odd} \\ \pi & \text{if } h = 1 \end{cases},$$

wherein H is a non-negative integer.

15. A receiver for receiving a CPM signal from a transmitter, wherein the receiver and the transmitter are comprised in a wireless communications network, and wherein the receiver comprises means adapted to:
receive a CPM signal comprising a first received bit sequence in a first sample stream and a second received bit sequence in a second sample stream;
derotate the received CPM signal by a derotation angle, which derotation angle depends upon a modulation index value, h;
when the modulation index value, h, is an integer, remove a deterministic component of the derotated CPM signal;
time reverse and complex conjugate the first sample stream;
filter the respective first and second sample streams by means of a matched Multiple-Input Multiple-Output filter, whereby the respective first and second received bit sequences are decoupled; and
continuous phase demodulate the respective first and second sample streams, whereby a sequence of user code bits comprised in the received CPM signal is obtained.

16. The receiver of claim 15, wherein the received CPM signal comprises a first and a second CPM signal.

17. The receiver of claim 15, further comprising means adapted to:
compensate for training sequence mismatch when the K first bits of a first training sequence, $t^1$, of the first received bit sequence are different from the time-reversed and flipped last K bits of a second training sequence, $t^2$, of the second received bit sequence, that is when $t^1_k \neq 1-(t^2_{P+1-k})$ for k=1, ..., K-1, and when the K first bits of the first training sequence, $t^1$, of the first received bit sequence are different from the time reversed K last bits of the second training sequence, $t^2$, of the second received bit sequence, that is when $t^2_k \neq 1-(t^1_{P+1-k})$ for k=1, ..., K-1, wherein K is an integer larger than 0 and wherein P is the number of training bits.

18. The receiver of claim 15, wherein the derotation angle depends upon the modulation index value, h, such that the $$\text{derotation angle} = \begin{cases} -\pi/2 & \text{if } h = H + 0.5 \text{ and } H \text{ even} \\ \pi/2 & \text{if } h = H + 0.5 \text{ and } H \text{ odd} \\ \pi & \text{if } h = 1 \end{cases},$$

wherein H is a non-negative integer.

19. A non-transitory computer-readable medium, comprising instructions which, when executed on at least one processor, causes the at least one processor to carry out the method according to claim 1.

* * * * *